US012760177B2

(12) United States Patent
Kato et al.

(10) Patent No.: US 12,760,177 B2
(45) Date of Patent: Oct. 13, 2026

(54) THERMOPLASTIC RESIN AND OPTICAL LENS INCLUDING SAME

(71) Applicant: MITSUBISHI GAS CHEMICAL COMPANY, INC., Tokyo (JP)

(72) Inventors: Noriyuki Kato, Tokyo (JP); Katsushi Nishimori, Tokyo (JP); Atsushi Motegi, Tokyo (JP); Tatsunobu Ogata, Tokyo (JP); Yutaro Harada, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 612 days.

(21) Appl. No.: 18/273,105

(22) PCT Filed: Jan. 26, 2022

(86) PCT No.: PCT/JP2022/002759
§ 371 (c)(1),
(2) Date: Jul. 19, 2023

(87) PCT Pub. No.: WO2022/163674
PCT Pub. Date: Aug. 4, 2022

(65) Prior Publication Data

US 2024/0166867 A1 May 23, 2024

(30) Foreign Application Priority Data

Jan. 27, 2021 (JP) ................................ 2021-010734
Mar. 30, 2021 (JP) ................................ 2021-056372

(51) Int. Cl.
*C08G 64/16* (2006.01)
*C08G 63/64* (2006.01)
*C08L 71/02* (2006.01)
*C08K 5/1575* (2006.01)

(52) U.S. Cl.
CPC .............. *C08L 71/02* (2013.01); *C08G 63/64* (2013.01); *C08G 64/1608* (2013.01); *C08K 5/1575* (2013.01)

(58) Field of Classification Search
None
See application file for complete search history.

(56) References Cited

U.S. PATENT DOCUMENTS 3,708,502 A * 1/1973 Dunlop ................ C07D 317/20
549/370
2012/0289676 A1 11/2012 Minezaki et al.
2013/0116366 A1 5/2013 Rao et al.
2014/0142273 A1 5/2014 Minezaki et al.
2016/0291210 A1 10/2016 Fukagawa et al.
2019/0055351 A1 2/2019 Kato et al.

FOREIGN PATENT DOCUMENTS

JP 2011-26499 A 2/2011
JP 2016-191722 A 11/2016
JP 2018-2893 A 1/2018
JP 2018-2894 A 1/2018
JP 2018-2895 A 1/2018
JP 2018-59074 A 4/2018
JP 7640870 B2 2/2025
WO 2011/083705 A1 7/2011
WO 2011/086583 A2 7/2011
WO 2017/078073 A1 5/2017
WO WO2022/163684 * 8/2022

OTHER PUBLICATIONS

Huang; Micelles Based on Acid Degradable Poly(Acetal Urethane); BioMacromolecules 2015,16,pp. 2228-2236. (Year: 2015).*
International Search Report issued Apr. 12, 2022 in International Bureau of WIPO Patent Application No. PCT/JP2022/002759 with an English translation thereof.
Written Opinion issued Apr. 12, 2022 in International Bureau of WIPO Patent Application No. PCT/JP2022/002759 with an English translation thereof.
Office Action, dated Jul. 1, 2025, in Japanese family member application No. 2022-578430 with English language (machine) translation thereof.

* cited by examiner

*Primary Examiner* — David J Buttner
(74) *Attorney, Agent, or Firm* — GREENBLUM & BERNSTEIN, P.L.C.

(57) ABSTRACT

According to the present application, there can be provided a thermoplastic resin including a constituent unit (A) derived from a monomer represented by the following general formula (1):

(1)

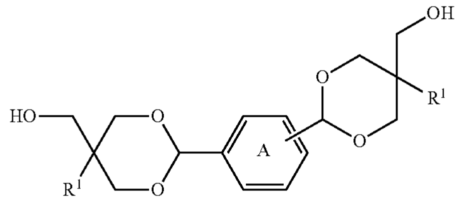

wherein $R^1$s, which are the same or different, each represent a hydrogen atom, a fluorine atom, a chlorine atom, a bromine atom, a phenyl group, or a linear or branched alkyl group containing 1 to 4 carbon atoms; and ring A represents a benzene ring optionally substituted with 1 to 4 groups selected from the group consisting of a fluorine atom, a chlorine atom, a bromine atom, a phenyl group, a linear or branched alkoxy group containing 1 to 6 carbon atoms, and a linear or branched alkyl group containing 1 to 6 carbon atoms.

18 Claims, No Drawings

THERMOPLASTIC RESIN AND OPTICAL LENS INCLUDING SAME

PARTIES TO A JOINT RESEARCH AGREEMENT

The presently claimed invention was made by or on behalf of the below listed parties to a joint research agreement. The joint research agreement was in effect on or before the effective filing date of the claimed invention, and the claimed invention was made as a result of activities undertaken within the scope of the joint research agreement. The parties to the joint research agreement are Mitsubishi Gas Chemical Company, Inc. and New Japan Chemical Co., Ltd.

TECHNICAL FIELD

The present invention relates to a thermoplastic resin and an optical lens comprising the same. More specifically, the present invention relates to a polycarbonate resin or a polyester carbonate resin, and an optical lens comprising the same.

BACKGROUND ART

As materials for optical lenses used in the optical systems of various types of cameras, such as a camera, a film-integrated camera and a video camera, optical glasses or optical resins have been used. Such optical glasses are excellent in heat resistance, transparency, dimensional stability, chemical resistance and the like. However, the optical glasses are problematic in terms of high material costs, poor formability and low productivity.

On the other hand, an optical lens consisting of an optical resin is advantageous in that it can be produced in a large amount by injection molding, and as materials having a high refractive index for use in camera lenses, polycarbonate, polyester carbonate, and polyester resins, etc. can be used.

When such an optical resin is used as an optical lens, the used optical resin is required to have heat resistance, transparency, low water absorbability, chemical resistance, low birefringence, resistance to moist heat, etc., in addition to optical properties such as refractive index and Abbe number. In particular, in recent years, optical lenses having high refractive index and high heat resistance have been required, and thus, various resins have been developed (Patent Literatures 1 to 5).

Meanwhile, thermoplastic resins having, as a raw material, a diol compound having a cyclic acetal structure (e.g. spiroglycol) have excellent optical properties and impact resistance, and are useful as various types of optical resins. However, for various mold fabrications and expansion of usage environment, it has been desired to further improve the heat resistance of such thermoplastic resins without impairing the optical properties thereof.

CITATION LIST

Patent Literature

Patent Literature 1: JP Patent Publication (Kokai) No. 2018-2893 A
Patent Literature 2: JP Patent Publication (Kokai) No. 2018-2894 A
Patent Literature 3: JP Patent Publication (Kokai) No. 2018-2895 A
Patent Literature 4: JP Patent Publication (Kokai) No. 2018-59074 A
Patent Literature 5: International Publication WO2017/078073

SUMMARY OF INVENTION

Technical Problem

It is an object of the present invention to provide a thermoplastic resin that is excellent in terms of optical properties such as refractive index and Abbe number, and is also excellent in terms of heat resistance, and an optical lens in which the aforementioned thermoplastic resin is used.

Solution to Problem

As a result of intensive studies directed towards achieving the aforementioned conventional object, the present inventors have found that a thermoplastic resin that is excellent in terms of optical properties such as refractive index and Abbe number and is also excellent in terms of heat resistance can be obtained by using, as a raw material, a monomer having a specific structure, in which an aromatic ring is introduced into a diol compound having a cyclic acetal structure, thereby completing the present invention.

Specifically, the present invention includes the following embodiments.

<1> A thermoplastic resin comprising a constituent unit (A) derived from a monomer represented by the following general formula (1):

(1)

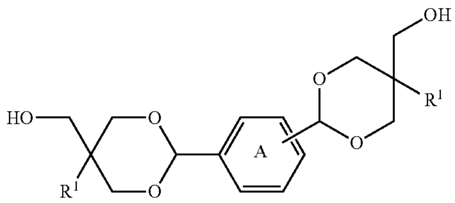

wherein $R^1$s, which are the same or different, each represent a hydrogen atom, a fluorine atom, a chlorine atom, a bromine atom, a phenyl group, or a linear or branched alkyl group containing 1 to 4 carbon atoms; and ring A represents a benzene ring optionally substituted with 1 to 4 groups selected from the group consisting of a fluorine atom, a chlorine atom, a bromine atom, a phenyl group, a linear or branched alkoxy group containing 1 to 6 carbon atoms, and a linear or branched alkyl group containing 1 to 6 carbon atoms.

<2> The thermoplastic resin according to the above <1>, which is a polycarbonate resin or a polyester carbonate resin.

<3> The thermoplastic resin according to the above <1> or <2>, wherein, in the general formula (1), $R^1$s, which are the same or different, each represent a methyl group, an ethyl group, an n-propyl group, an iso-propyl group, an n-butyl group, an iso-butyl group, a sec-butyl group, a tert-butyl group, or a phenyl group.

<4> The thermoplastic resin according to the above <3>, wherein, in the general formula (1), $R^1$s, which are the same or different, each represent a methyl group or an ethyl group.

<5> The thermoplastic resin according to any one of the above <1> to <4>, wherein, in the general formula (1), the ring A represents a benzene ring optionally substituted with 1 to 4 groups selected from the group consisting of a linear or branched alkoxy group containing 1 to 6 carbon atoms and a linear or branched alkyl group containing 1 to 6 carbon atoms.

<6> The thermoplastic resin according to any one of the above <1> to <5>, wherein, in the general formula (1), $R^1$ represents a methyl group or an ethyl group, and the ring A represents a benzene ring optionally substituted with 1 to 4 groups selected from the group consisting of a methyl group and an ethyl group.

<7> The thermoplastic resin according to the above <1> or <2>, wherein the monomer represented by the general formula (1) is a monomer represented by the following general formula (1a):

(1a)

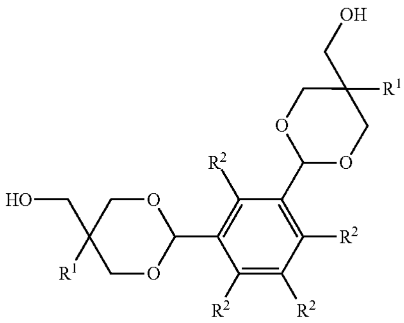

wherein $R^2$s, which are the same or different, each represent a hydrogen atom, a fluorine atom, a chlorine atom, a bromine atom, a phenyl group, a linear or branched alkoxy group containing 1 to 6 carbon atoms, or a linear or branched alkyl group containing 1 to 6 carbon atoms; and $R^1$ is as defined above.

<8> The thermoplastic resin according to the above <1> or <2>, wherein the monomer represented by the general formula (1) is a monomer represented by the following general formula (1b):

(1b)

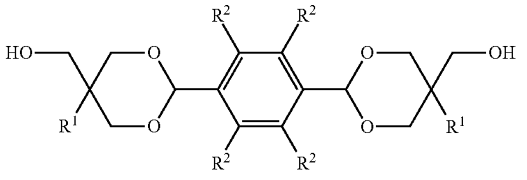

wherein $R^2$s, which are the same or different, each represent a hydrogen atom, a fluorine atom, a chlorine atom, a bromine atom, a phenyl group, a linear or branched alkoxy group containing 1 to 6 carbon atoms, or a linear or branched alkyl group containing 1 to 6 carbon atoms; and $R^1$ is as defined above.

<9> The thermoplastic resin according to the above <1> or <2>, wherein the monomer represented by the general formula (1) is a monomer represented by the following general formula (1c):

(1c)

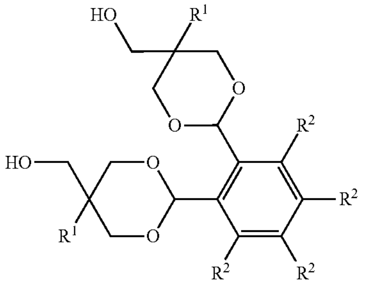

wherein $R^2$s, which are the same or different, each represent a hydrogen atom, a fluorine atom, a chlorine atom, a bromine atom, a phenyl group, a linear or branched alkoxy group containing 1 to 6 carbon atoms, or a linear or branched alkyl group containing 1 to 6 carbon atoms; and $R^1$ is as defined above.

<10> The thermoplastic resin according to any one of the above <1> to <9>, which comprises a constituent unit (B) derived from a monomer represented by the following formula (2) and/or a constituent unit (C) derived from a monomer represented by the following formula (3):

(2)

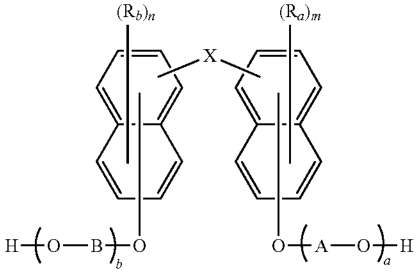

wherein, in the formula (2), $R_a$ and $R_b$ are each independently selected from the group consisting of a hydrogen atom, a halogen atom, a C1-C20 alkyl group optionally having a substituent, a C1-C20 alkoxy group optionally having a substituent, a C5-C20 cycloalkyl group optionally having a substituent, a C5-C20 cycloalkoxy group optionally having a substituent, a C6-C20 aryl group optionally having a substituent, a C6-C20 heteroaryl group optionally having a substituent, which contains one or more heterocyclic atoms selected from O, N and S, a C6-C20 aryloxy group optionally having a substituent, and $—C≡C—R_h$, wherein $R_h$ represents a C6-C20 aryl group optionally having a substituent, or a C6-C20 heteroaryl group optionally having a substituent, which contains one or more heterocyclic atoms selected from O, N and S, X represents a single bond or a fluorene group optionally having a substituent, A and B each independently represent a C1-C5 alkylene group optionally having a substituent, m and n each independently represent an integer of 0 to 6, and a and b each independently represent an integer of 0 to 10; and/or, (3)

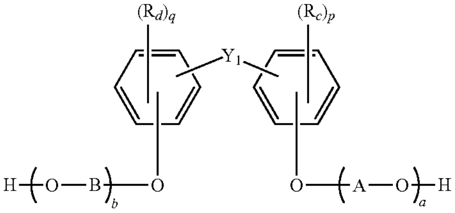

wherein, in the formula (3), $R_c$ and $R_d$ each independently selected from the group consisting of a hydrogen atom, a halogen atom, a C1-C20 alkyl group optionally having a substituent, a C1-C20 alkoxy group optionally having a substituent, a C5-C20 cycloalkyl group optionally having a substituent, a C5-C20 cycloalkoxy group optionally having a substituent, and a C6-C20 aryl group optionally having a substituent, $Y_1$ represents a single bond, a fluorene group optionally having a substituent, or any one of structural formulae represented by the following formulae (4) to (10):

(4)

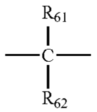

(5)

$—S—$ (6)

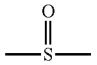

(7)

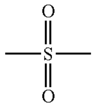

(8)

$—(CH_2)_r—$ (9)

$—O—$ (10)

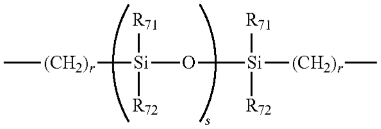

wherein, in the formulae (4) to (10), $R_{61}$, $R_{62}$, $R_{71}$ and $R_{72}$ each independently represent a hydrogen atom, a halogen atom, a C1-C20 alkyl group optionally having a substituent, or a C6-C30 aryl group optionally having a substituent, or represent a C1-C20 carbon ring or heterocyclic ring optionally having a substituent, which is formed as a result that $R_{61}$ and $R_{62}$, or $R_{71}$ and $R_{72}$ bind to each other, and r and s each independently represent an integer of 0 to 5000, A and B each independently represent a C1-C5 alkylene group optionally having a substituent, p and q each independently represent an integer of 0 to 4, and a and b each independently represent an integer of 0 to 10.

<11> The thermoplastic resin according to the above <10>, wherein, in the formula (2) and the formula (3), the A and B each independently represent an alkylene group containing 2 or 3 carbon atoms.

<12> The thermoplastic resin according to the above <10> or <11>, which comprises a constituent unit derived from, at least, any one of BPEF, BNE, BNEF and DPBHBNA.

<13> The thermoplastic resin according to any one of the above <1> to <12>, which further comprises a constituent unit derived from at least one monomer selected from the following monomer group:

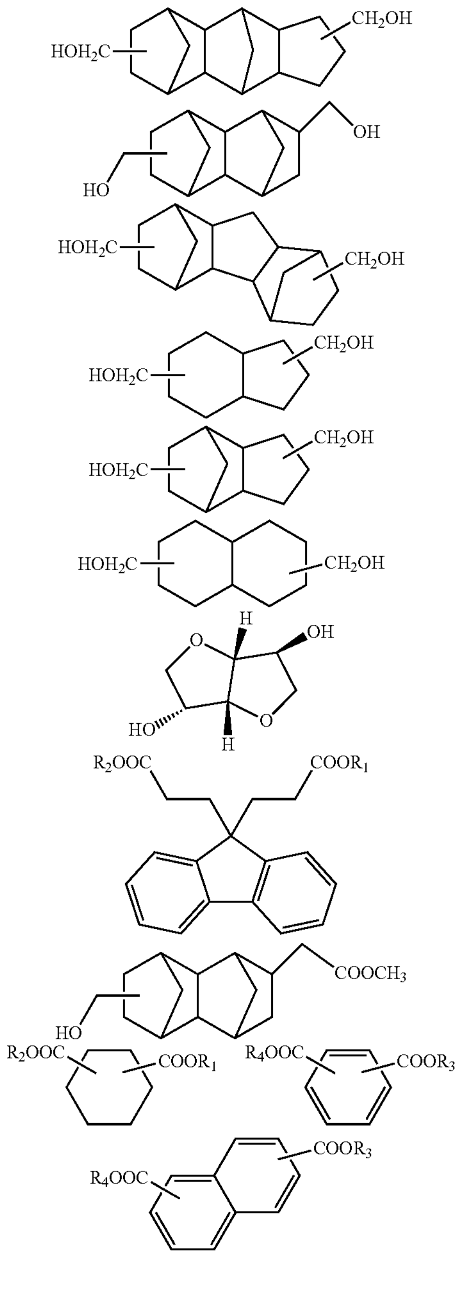

wherein, in the formulae, $R_1$ and $R_2$ each independently represent a hydrogen atom, a methyl group or an ethyl group, and $R_3$ and $R_4$ each independently represent a hydrogen atom, a methyl group, an ethyl group, or alkylene glycol containing 2 to 5 carbon atoms.

<14> The thermoplastic resin according to any one of the above <1> to <13>, which has a polystyrene-converted weight average molecular weight (Mw) of 10,000 to 200,000.

<15> The thermoplastic resin according to any one of the above <1> to <14>, which has a refractive index (nD) of 1.599 to 1.750.

<16> The thermoplastic resin according to any one of the above <1> to <15>, which has an Abbe number (v) of 25.0 to 33.0.

<16> The thermoplastic resin according to any one of the above <1> to <16>, which has a glass transition temperature of 135° C. to 200° C.

<18> A thermoplastic resin composition, comprising a modifier represented by the following general formula (1) and a thermoplastic resin:

(1)

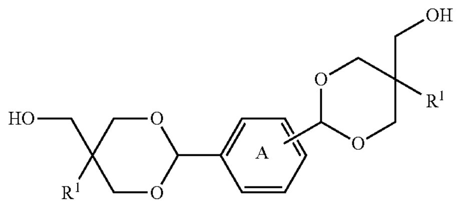

wherein $R^1$s, which are the same or different, each represent a hydrogen atom, a fluorine atom, a chlorine atom, a bromine atom, a phenyl group, or a linear or branched alkyl group containing 1 to 4 carbon atoms; and ring A represents a benzene ring optionally substituted with 1 to 4 groups selected from the group consisting of a fluorine atom, a chlorine atom, a bromine atom, a phenyl group, a linear or branched alkoxy group containing 1 to 6 carbon atoms, and a linear or branched alkyl group containing 1 to 6 carbon atoms.

<19> An optical member, comprising the thermoplastic resin according to any one of the above <1> to <17> or the thermoplastic resin composition according to the above <20>.

<20> An optical lens, comprising the thermoplastic resin according to any one of the above <1> to <17> or the thermoplastic resin composition according to the above <18>.

<21> An optical film, comprising the thermoplastic resin according to any one of the above <1> to <17> or the thermoplastic resin composition according to the above <18>.

Advantageous Effects of Invention

According to the present invention, there can be provided: a thermoplastic resin that is excellent in terms of optical properties such as refractive index and Abbe number, and is also excellent in terms of heat resistance; and an optical lens comprising the same.

DESCRIPTION OF EMBODIMENTS

Hereinafter, the present invention will be described in detail by exemplifying Synthetic Examples, Examples, and the like, but the present invention is not limited to the exemplified Synthetic Examples, Examples, and the like. The methods described below can be changed to any methods within a range that does not deviate from the contents of the present invention.

<Thermoplastic Resin>

One embodiment of the present invention relates to a thermoplastic resin comprising a constituent unit (A) derived from a monomer represented by the following general formula (1):

(1)

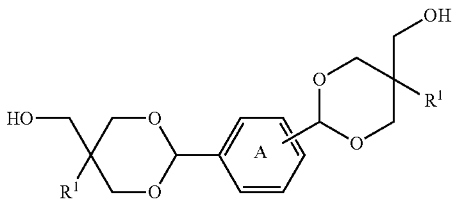

wherein $R^1$s, which are the same or different, each represent a hydrogen atom, a fluorine atom, a chlorine atom, a bromine atom, a phenyl group, or a linear or branched alkyl group containing 1 to 4 carbon atoms; and ring A represents a benzene ring optionally substituted with 1 to 4 groups selected from the group consisting of a fluorine atom, a chlorine atom, a bromine atom, a phenyl group, a linear or branched alkoxy group containing 1 to 6 carbon atoms, and a linear or branched alkyl group containing 1 to 6 carbon atoms.

In the general formula (1), $R^1$s, which are the same or different, each represent a hydrogen atom, a fluorine atom, a chlorine atom, a bromine atom, a phenyl group, or a linear or branched alkyl group containing 1 to 4 carbon atoms, and $R^1$s each preferably represent a linear or branched alkyl group containing 1 to 4 carbon atoms. The linear or branched alkyl group containing 1 to 4 carbon atoms represented by $R^1$ is not particularly limited, and examples thereof may include alkyl groups, such as a methyl group, an ethyl group, an n-propyl group, an iso-propyl group, an n-butyl group, an iso-butyl group, a sec-butyl group, and a tert-butyl group. Among these groups, a methyl group, an ethyl group, an iso-butyl group, and a tert-butyl group are preferable; a methyl group and an ethyl group are more preferable; and a methyl group is particularly preferable.

In the general formula (1), ring A means that two acetal groups bind at the ortho, meta, or para positions on the benzene ring. Specifically, ring A includes the following structure.

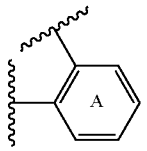
,
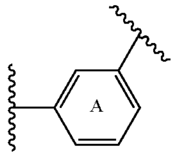
or
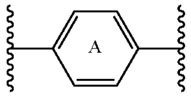

wherein ring A is as defined above.

In the general formula (1), ring A is preferably a benzene ring optionally substituted with 1 to 4 groups selected from the group consisting of a linear or branched alkoxy group containing 1 to 6 carbon atoms and a linear or branched alkyl group containing 1 to 6 carbon atoms.

The "linear or branched alkoxy group containing 1 to 6 carbon atoms" serving as a substituent is not particularly limited, and examples thereof may include a methoxy group, an ethoxy group, an n-propyloxy group, an isopropyloxy group, an n-butyloxy group, an isobutyloxy group, a sec-butyloxy group, and a tert-butyloxy group. Among these groups, a methoxy group, an ethoxy group, an isopropyloxy group, an isobutyloxy group, and a tert-butyloxy group are preferable.

The "linear or branched alkyl group containing 1 to 6 carbon atoms" serving as a substituent is not particularly limited, and examples thereof may include a methyl group, an ethyl group, an n-propyl group, an isopropyl group, an n-butyl group, an isobutyl group, a sec-butyl group, and a tert-butyl group. Among these groups, a methyl group, an ethyl group, an isopropyl group, an isobutyl group, and a tert-butyl group are preferable.

Ring A is particularly preferably a benzene ring that does not have a substituent, namely, a divalent phenylene group having the following structure.

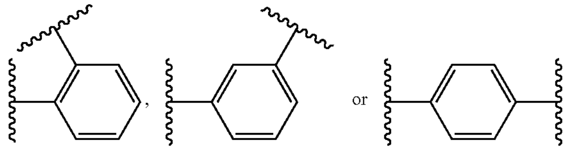

, or

It is considered that the compound represented by the general formula (1) includes multiple stereoisomers based on the configuration of hydroxymethyl groups in the two acetal groups and carbon atoms to which $R^1$s bind. These isomers may be present each alone or in the form of a mixture.

Three compounds, which are included in the compound represented by the general formula (1) and are classified based on the substitution positions of the two acetal groups on ring A, namely, the compounds represented by the following general formula (1a), general formula (1b) and general formula (1c) will be specifically described below.

The compound represented by the general formula (1a) is as follows:

(1a)

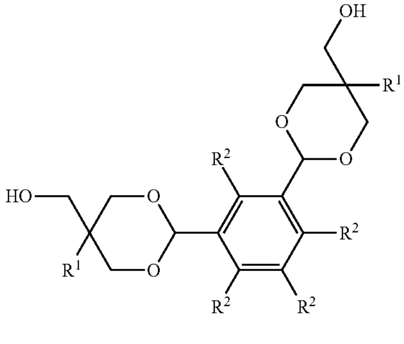

wherein $R^2$s, which are the same or different, each represent a hydrogen atom, a fluorine atom, a chlorine atom, a bromine atom, a phenyl group, a linear or branched alkoxy group containing 1 to 6 carbon atoms, or a linear or branched alkyl group containing 1 to 6 carbon atoms. $R^1$ is as defined above.

In the general formula (1a), $R^1$ is preferably a linear or branched alkyl group containing 1 to 4 carbon atoms, and examples thereof may include a methyl group, an ethyl group, an n-propyl group, an isopropyl group, an n-butyl group, an isobutyl group, a sec-butyl group, and a tert-butyl group. Among these groups, a methyl group, an ethyl group, an isobutyl group, and a tert-butyl group are preferable.

In the general formula (1a), $R^2$ is preferably a hydrogen atom, a linear or branched alkoxy group containing 1 to 6 carbon atoms, or a linear or branched alkyl group containing 1 to 6 carbon atoms. $R^2$ is particularly preferably a hydrogen atom.

The "linear or branched alkoxy group containing 1 to 4 carbon atoms" represented by $R^2$ is not particularly limited, and examples thereof may include a methoxy group, an ethoxy group, an n-propyloxy group, an isopropyloxy group, an n-butyloxy group, an isobutyloxy group, a sec-butyloxy group, and a tert-butyloxy group. Among these groups, a methoxy group, an ethoxy group, an isopropyloxy group, an isobutyloxy group, and a tert-butyloxy group are preferable.

The "linear or branched alkyl group containing 1 to 6 carbon atoms" represented by $R^2$ is not particularly limited, and examples thereof may include a methyl group, an ethyl group, an n-propyl group, an isopropyl group, an n-butyl group, an isobutyl group, a sec-butyl group, and a tert-butyl group. Among these groups, a methyl group, an ethyl group, an isopropyl group, an isobutyl group, and a tert-butyl group are preferable.

It is considered that the compound represented by the general formula (1a) includes isomers such as the following isomer A, isomer B, or isomer C. These isomers may be present each alone or in the form of a mixture.

Isomer (1a-A)

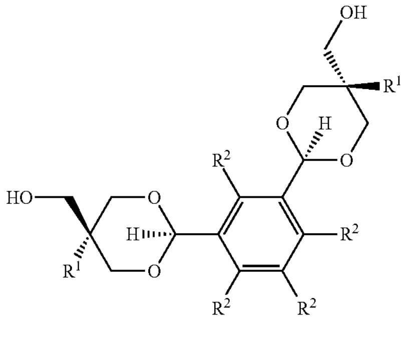

Isomer (1a-B)

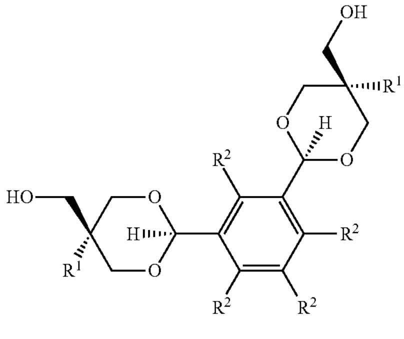

-continued

Isomer (1a-C)

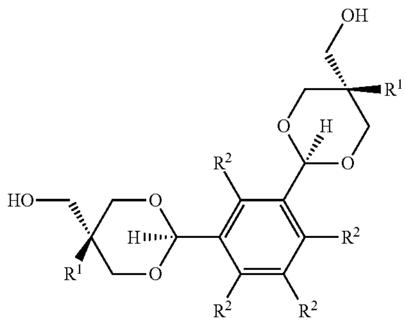

wherein $R^1$ and $R^2$ are as defined above.

When the compound represented by the general formula (1a) is a mixture of two or more isomers, the isomeric ratio can be obtained by performing gas chromatographic (GC) analysis using the method described in the Examples, and then applying an area normalization method. Each isomer generally has a specific peak according to the GC analysis. The content ratio of each isomer can be expressed with the percentage of the peak area of the isomer to the total peak area of a cyclic diol compound. The percentage of such each isomer can be defined to be the isomeric ratio. It is also possible to convert the hydroxyl group of the cyclic diol compound used in the present invention to trimethylsilyl by using N,O-bis(trimethylsilyl)trifluoroacetamide, etc., and then to perform the GC analysis.

It is considered that the compound represented by the general formula (1a) includes isomers such as the above-described isomer (1a-A), an isomer (1a-B), or isomer (1a-C). Two or three isomer peaks were detected by the GC analysis, and these are considered to be the isomer (1a-A), the isomer (1a-B), or the isomer (1a-C). The isomeric ratio obtained by the GC analysis can be set within the range that is the isomer (1a-A):the isomer (1a-B):the isomer (1a-C)=10 to 1:10 to 1:1.

Specific examples of the compound represented by the general formula (1a) may include isophthalaldehyde trimethylolpropane diacetal, isophthalaldehyde trimethylolethane diacetal, 5-methylisophthalaldehyde trimethylolethane diacetal, 4-methylisophthalaldehyde trimethylolethane diacetal, 4-chloroisophthalaldehyde trimethylolethane diacetal, 5-chloroisophthalaldehyde trimethylolethane diacetal, 5-bromoisophthalaldehyde trimethylolethane diacetal, 4-bromoisophthalaldehyde trimethylolethane diacetal, 2-bromoisophthalaldehyde trimethylolethane diacetal, 4,6-dimethylisophthalaldehyde trimethylolethane diacetal, 2,4-dimethylisophthalaldehyde trimethylolethane diacetal, 2,5-dichloroisophthalaldehyde trimethylolethane diacetal, 4,6-dichloroisophthalaldehyde trimethylolethane diacetal, 4,6-dibromoisophthalaldehyde trimethylolethane diacetal, 2,5-dibromoisophthalaldehyde trimethylolethane diacetal, 5-tert-butylisophthalaldehyde trimethylolethane diacetal, 2,4,5,6-tetrafluoroisophthalaldehyde trimethylolethane diacetal, 5-(bromomethyl)isophthalaldehyde trimethylolethane diacetal, 4-isopropylisophthalaldehyde trimethylolethane diacetal, 4,6-diisopropylisophthalaldehyde trimethylolethane diacetal, 2-bromo-5-tert-butylisophthalaldehyde trimethylolethane diacetal, 4-phenylisophthalaldehyde trimethylolethane diacetal, 5-phenylisophthalaldehyde trimethylolethane diacetal, 4-phenyl-6-methylisophthalaldehyde trimethylolethane diacetal, 4,5-diethyl-6-methylisophthalaldehyde trimethylolethane diacetal, 5-hexylisophthalaldehyde trimethylolethane diacetal, 4-hexylisophthalaldehyde trimethylolethane diacetal, 5-butyloxyis ophthalaldehyde trimethylolethane diacetal, 2-methoxyisophthalaldehyde trimethylolethane diacetal, 4-methoxyisophthalaldehyde trimethylolethane diacetal, 5-methoxyisophthalaldehyde trimethylolethane diacetal, 2-methoxy-4-methylisophthalaldehyde trimethylolethane diacetal, 2-methyl-4-methoxyisophthalaldehyde trimethylolethane diacetal, 2-methoxy-5-methylisophthalaldehyde trimethylolethane diacetal, 4-methyl-6-methoxyisophthalaldehyde trimethylolethane diacetal, 4,6-dimethoxyisophthalaldehyde trimethylolethane diacetal, 2-methoxy-4-ethylisophthalaldehyde trimethylolethane diacetal, 4,6-dimethyl-2-methoxyisophthalaldehyde trimethylolethane diacetal, 2,4-dimethoxy-6-methylisophthalaldehyde trimethylolethane diacetal, 2,4-dimethyl-6-methoxyisophthalaldehyde trimethylolethane diacetal, 4-ethyl-5-methyl-6-methoxyisophthalaldehyde trimethylolethane diacetal, 5-methylisophthalaldehyde trimethylolpropane diacetal, 4-methylisophthalaldehyde trimethylolpropane diacetal, 4-chloroisophthalaldehyde trimethylolpropane diacetal, 5-chloroisophthalaldehyde trimethylolpropane diacetal, 5-bromoisophthalaldehyde trimethylolpropane diacetal, 4-bromoisophthalaldehyde trimethylolpropane diacetal, 2-bromoisophthalaldehyde trimethylolpropane diacetal, 4,6-dimethylisophthataldehyde trimethylolpropane diacetal, 2,4-dimethylisophthalaldehyde trimethylolpropane diacetal, 2,5-dichloroisophthalaldehyde trimethylolpropane diacetal, 4,6-dichloroisophthalaldehyde trimethylolpropane diacetal, 4,6-dibromoisophthalaldehyde trimethylolpropane diacetal, 2,5-dibromoisophthalaldehyde trimethylolpropane diacetal, 5-tert-butylisophthalaldehyde trimethylolpropane diacetal, 2,4,5,6-tetrafluoroisophthalaldehyde trimethylolpropane diacetal, acetal, 4-isopropylisophthalaldehyde trimethylolpropane diacetal, 4,6-diisopropylisophthalaldehyde trimethylolpropane diacetal, 2-bromo-5-tert-butylisophthalaldehyde trimethylolpropane diacetal, 4-phenylisophthalaldehyde trimethylolpropane diacetal, 5-phenylisophthalaldehyde trimethylolpropane diacetal, 4-phenyl-6-methylisophthalaldehyde trimethylolpropane diacetal, 4,5-diethyl-6-methylisophthalaldehyde trimethylolpropane diacetal, 5-hexylisophthalaldehyde trimethylolpropane diacetal, 4-hexylisophthalaldehyde trimethylolpropane diacetal, 5-butyloxyisophthalaldehyde trimethylolpropane diacetal, 2-methoxyisophthalaldehyde trimethylolpropane diacetal, 4-methoxyisophthalaldehyde trimethylolpropane diacetal, 5-methoxyisophthalaldehyde trimethylolpropane diacetal, 2-methoxy-4-methylisophthalaldehyde trimethylolpropane diacetal, 2-methyl-4-methoxyisophthalaldehyde trimethylolpropane diacetal, 2-methoxy-5-methylisophthalaldehyde trimethylolpropane diacetal, 4-methyl-6-methoxyisophthalaldehyde trimethylolpropane diacetal, 4,6-dimethoxyisophthalaldehyde trimethylolpropane diacetal, 2-methoxy-4-ethylisophthalaldehyde trimethylolpropane diacetal, 4,6-dimethyl-2-methoxyisophthalaldehyde trimethylolpropane diacetal, 2,4-dimethoxy-6-methylisophthalaldehyde trimethylolpropane diacetal, 2,4-dimethyl-6-methoxyisophthalaldehyde trimethylolpropane diacetal, and 4-ethyl-5-methyl-6-methoxyisophthalaldehyde trimethylolpropane diacetal. Among these, preferred compounds may include isophthalaldehyde trimethylolpropane diacetal, isophthalaldehyde trimethylolethane diacetal, 5-methylisophthalaldehyde trimethylolethane diacetal, 5-methylisophthalaldehyde trimethylolpropane diacetal, 4-methylisophthalaldehyde trimethylolpropane diacetal, and 4-methylisophthalaldehyde trimethylolethane diacetal; and particularly preferred compounds may include isophthalaldehyde trimethylolpropane diacetal and isophthalaldehyde trimethylolethane diacetal.

The compound represented by the general formula (1b) is as follows:

(1b)

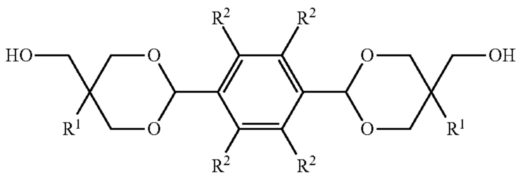

wherein $R^1$ and $R^2$ are as defined above.

Preferred $R^1$ in the general formula (1b) is the same as preferred $R^1$ in the general formula (1a). In addition, preferred $R^2$ in the general formula (1b) is the same as preferred $R^2$ in the general formula (1a).

It is considered that the compound represented by the general formula (1b) includes isomers such as the following isomer (1b-A), an isomer (1b-B), or isomer (1b-C). These isomers may be present each alone or in the form of a mixture.

Isomer (1b-A)

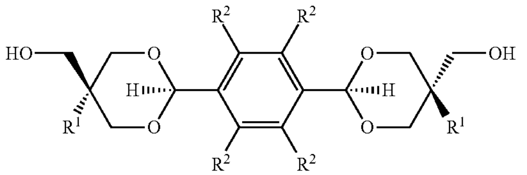

Isomer (Ib-B)

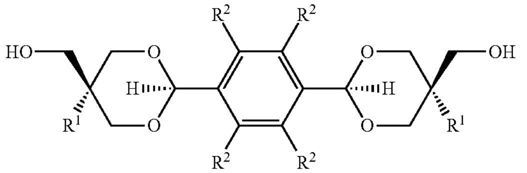

Isomer (1b-C)

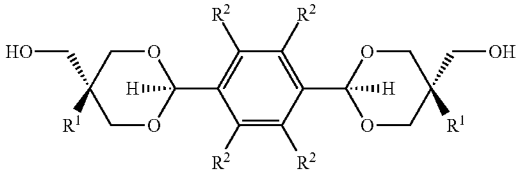

wherein $R^1$ and $R^2$ are as defined above.

When the compound represented by the general formula (1b) is a mixture of two or more isomers, the isomeric ratio can be obtained by performing gas chromatographic (GC) analysis using the method described in the Examples, and then applying an area normalization method. Each isomer generally has a specific peak according to the GC analysis. The content ratio of each isomer can be expressed with the percentage of the peak area of the isomer to the total peak area of a cyclic diol compound. The percentage of such each isomer can be defined to be the isomeric ratio. It is also possible to convert the hydroxyl group of the cyclic diol compound used in the present invention to trimethylsilyl by using N,O-bis(trimethylsilyl)trifluoroacetamide, etc., and then to perform the GC analysis.

It is considered that the compound represented by the general formula (1b) includes isomers such as the above-described isomer (1b-A), an isomer (1b-B), or isomer (1b-C). Two or three isomer peaks were detected by the GC analysis, and these are considered to be the isomer (1b-A), the isomer (1b-B), or the isomer (1b-C). The isomeric ratio obtained by the GC analysis can be set within the range that is the isomer (1b-A):the isomer (1b-B):the isomer (1b-C) =10 to 1:10 to 1:1.

Specific examples of the compound represented by the general formula (1b) may include terephthalaldehyde trimethylolpropane diacetal, terephthalaldehyde trimethylolethane diacetal, 2-methylterephthalaldehyde trimethylolethane di acetal, 3-methylterephthalaldehyde trimethylolethane diacetal, 3-chloroterephthalaldehyde trimethylolethane di acetal, 2-chloroterephthalaldehyde trimethylolethane di acetal, 2-bromoterephthalaldehyde trimethylolethane di acetal, 3-bromoterephthalaldehyde trimethylolethane diacetal, 3,6-dimethylterephthalaldehyde trimethylolethane diacetal, 2,3-dimethylterephthalaldehyde trimethylolethane diacetal, 2,5-dichloroterephthalaldehyde trimethylolethane diacetal, 3,6-dichloroterephthalaldehyde trimethylolethane diacetal, 3,6-dibromoterephthalaldehyde trimethylolethane diacetal, 2,5-dibromoterephthalaldehyde trimethylolethane diacetal, 2-tert-butylterephthalaldehyde trimethylolethane diacetal, 2,3,5,6-tetrafluoroterephthalaldehyde trimethylolethane diacetal, 3-isopropylterephthalaldehyde trimethylolethane diacetal, 3,6-diisopropylterephthalaldehyde trimethylolethane diacetal, 2-bromo-5-tert-butylterephthalaldehyde trimethylolethane diacetal, 3-phenylterephthalaldehyde trimethylolethane diacetal, 2-phenylterephthalaldehyde trimethylolethane diacetal, 3-phenyl-6-methylterephthalaldehyde trimethylolethane diacetal, 3,5-diethyl-6-methylterephthalaldehyde trimethylolethane diacetal, 2-hexylterephthalaldehyde trimethylolethane diacetal, 3-hexylterephthalaldehyde trimethylolethane diacetal, 2-butyloxyterephthalaldehyde trimethylolethane diacetal, 3-methoxyterephthalaldehyde trimethylolethane diacetal, 2-methoxyterephthalaldehyde trimethylolethane diacetal, 2-methoxy-3-methylterephthalaldehyde trimethylolethane diacetal, 2-methyl-3-methoxyterephthalaldehyde trimethylolethane diacetal, 2-methoxy-5-methylterephthalaldehyde trimethylolethane diacetal, 3-methyl-6-methoxyterephthalaldehyde trimethylolethane diacetal, 3,6-dimethoxyterephthalaldehyde trimethylolethane diacetal, 2-methoxy-3-ethylterephthalaldehyde trimethylolethane diacetal, 3,6-dimethyl-2-methoxyterephthalaldehyde trimethylolethane diacetal, 2,3-dimethoxy-6-methylterephthalaldehyde trimethylolethane diacetal, 2,3-dimethyl-6-methoxyterephthalaldehyde trimethylolethane diacetal, 3-ethyl-5-methyl-6-methoxyterephthalaldehyde trimethylolethane diacetal, 2-methylterephthalaldehyde trimethylolpropane diacetal, 3-methylterephthalaldehyde trimethylolpropane diacetal, 3-chloroterephthalaldehyde trimethylolpropane diacetal, 2-chloroterephthalaldehyde trimethylolpropane diacetal, 2-bromoterephthalaldehyde trimethylolpropane diacetal, 3-bromoterephthalaldehyde trimethylolpropane diacetal, 3,6-dimethylterephthalaldehyde trimethylolpropane diacetal, 2,3-dimethylterephthalaldehyde trimethylolpropane diacetal, 2,5-dichloroterephthalaldehyde trimethylolpropane diacetal, 3,6-dichloroterephthalaldehyde trimethylolpropane diacetal, 3,6-dibromoterephthalaldehyde trimethylolpropane diacetal, 2,5-dibromoterephthalaldehyde trimethylolpropane diacetal, 2-tert-butylterephthalaldehyde trimethylolpropane diacetal, 2,3,5,6-tetrafluoroterephthalaldehyde trimethylolpropane diacetal, 3-isopropylterephthalaldehyde trimethylolpropane diacetal, 3,6-diisopropylterephthalaldehyde trimethylolpropane diacetal, 2-bromo-5-tert-butylterephthalaldehyde trimethylolpropane diacetal, 3-phenylterephthalaldehyde trimethylolpropane diacetal, 2-phenylterephthalaldehyde trimethylolpropane diacetal, 3-phenyl-6-methylterephthalaldehyde trimethylolpropane diacetal, 3,5-diethyl-6-methylterephthalaldehyde trimethylolpropane diacetal, 2-hexylterephthalaldehyde trimethylolpropane diacetal, 3-hexylterephthalaldehyde trimethylolpropane diacetal, 2-butyloxyterephthalaldehyde trimethylolpropane diacetal, 3-methoxyterephthalaldehyde trimethylolpropane diacetal, 2-methoxyterephthalaldehyde trimethylolpropane diacetal, 2-methoxy-3-methylterephthalaldehyde trimethylolpropane diacetal, 2-methyl-3-methoxyterephthalaldehyde trimethylolpropane diacetal, 3-methyl-6-methoxyterephthalaldehyde trimethylolpropane diacetal, 3,6-dimethoxyterephthalaldehyde trimethylolpropane diacetal, 2-methoxy-3-ethylterephthalaldehyde trimethylolpropane diacetal, 2-methoxy-5-methylterephthalaldehyde trimethylolpropane diacetal, 3,6-dimethyl-2-methoxyterephthalaldehyde trimethylolpropane diacetal, 2,3-dimethoxy-6-methylterephthalaldehyde trimethylolpropane diacetal, 2,3-dimethyl-6-methoxyterephthalaldehyde trimethylolpropane diacetal, and 3-ethyl-5-methyl-6-methoxyterephthalaldehyde trimethylolpropane diacetal. Among these, preferred compounds may include terephthalaldehyde trimethylolpropane diacetal, terephthalaldehyde trimethylolethane diacetal, 2-methylterephthalaldehyde trimethylolethane diacetal, 2-methylterephthalaldehyde trimethylolpropane diacetal, 3-methylterephthalaldehyde trimethylolpropane diacetal, and 3-methylterephthalaldehyde trimethylolethane diacetal; and particularly preferred compounds may include terephthalaldehyde trimethylolpropane diacetal and terephthalaldehyde trimethylolethane diacetal.

The compound represented by the general formula (1c) is as follows:

(1c)

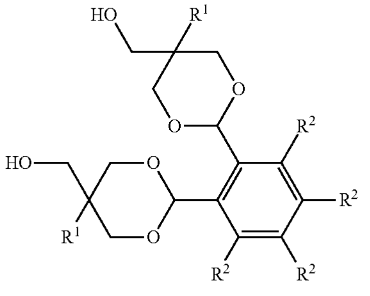

wherein $R^1$ and $R^2$ are as defined above.

Preferred $R^1$ in the general formula (1c) is the same as preferred $R^1$ in the general formula (1a). In addition, preferred $R^2$ in the general formula (1c) is the same as preferred $R^2$ in the general formula (1a).

It is considered that the compound represented by the general formula (1c) includes isomers such as the following isomer (1c-A), an isomer (1c-B), or isomer (1c-C). These isomers may be present each alone or in the form of a mixture.

Isomer (1c-A)

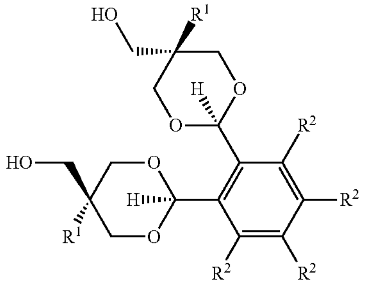

Isomer (1c-B)

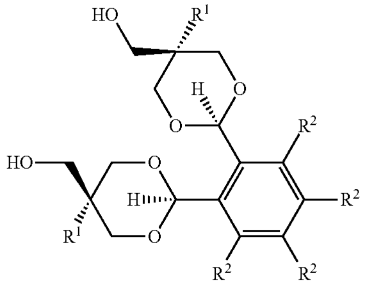

Isomer (1c-C)

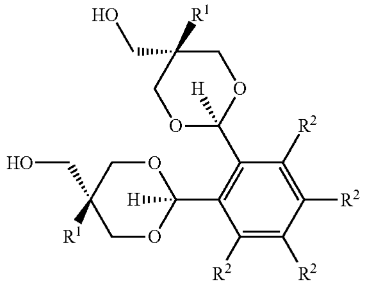

wherein $R^1$ and $R^2$ are as defined above.

When the compound represented by the general formula (1c) is a mixture of two or more isomers, the isomeric ratio can be obtained by performing gas chromatographic (GC) analysis using the method described in the Examples, and then applying an area normalization method. Each isomer generally has a specific peak according to the GC analysis. The content ratio of each isomer can be expressed with the percentage of the peak area of the isomer to the total peak area of a cyclic diol compound. The percentage of such each isomer can be defined to be the isomeric ratio. It is also possible to convert the hydroxyl group of the cyclic diol compound used in the present invention to trimethylsilyl by using N,O-bis(trimethylsilyl)trifluoroacetamide, etc., and then to perform the GC analysis.

It is considered that the compound represented by the general formula (1c) includes isomers such as the above-described isomer (1c-A), an isomer (1c-B), or isomer (1c-C). Two or three isomer peaks were detected by the GC analysis, and these are considered to be the isomer (1c-A), the isomer (1c-B), or the isomer (1c-C). The isomeric ratio obtained by the GC analysis can be set within the range that is the isomer (1c-A):the isomer (1c-B):the isomer (1c-C)=10 to 1:10 to 1:1.

Specific examples of the compound represented by the general formula (1c) may include orthophthalaldehyde trimethylolpropane diacetal, orthophthalaldehyde trimethylolethane diacetal, 3-methylorthophthalaldehyde trimethylolethane diacetal, 4-methylorthophthalaldehyde trimethylolethane diacetal, 3-chloroorthophthalaldehyde trimethylolethane diacetal, 3-bromoorthophthalaldehyde trimethylolethane diacetal, 3,6-dimethylorthophthalaldehyde trimethylolethane diacetal, 3,4-dimethylorthophthaladehyde trimethylolethane diacetal, 3,5-dimethylorthophthaaldehyde trimethylolethane diacetal, 4,5-dimethylorthophthalaldehyde trimethylolethane diacetal, 3,6-dichloroorthophthalaldehyde trimethylolethane diacetal, 3,6-dibromoorthophthalaldehyde trimethylolethane diacetal, 3,6-diethyl-4-methylorthophthalaldehyde trimethylolethane diacetal, 3-hexylorthophthalaldehyde trimethylolethane di acetal, 3-butyloxyorthophthalaldehyde trimethylolethane diacetal, 3-methoxyorthophthalaldehyde trimethylolethane diacetal, 3-methoxy-6-methylorthophthalaldehyde trimethylolethane diacetal, 3-methyl-6-methoxyorthophthalaldehyde trimethylolethane diacetal, 3,6-dimethoxyorthophthalaldehyde trimethylolethane diacetal, 3-methoxy-6-ethylorthophthalaldehyde trimethylolethane diacetal, 3,6-dimethyl-4-methoxy orthophthalaldehyde trimethylolethane diacetal, 3,6-dimethoxy-4-methylorthophthalaldehyde trimethylolethane diacetal, 3-methylorthophthalaldehyde trimethylolpropane diacetal, 4-methylorthophthalaldehyde trimethylolpropane diacetal, 3-chloroorthophthalaldehyde trimethylolpropane diacetal, 3-bromoorthophthalaldehyde trimethylolpropane diacetal, 3,6-dimethylorthophthalaldehyde trimethylolpropane diacetal, 3,4-dimethylorthophthalaldehyde trimethylolpropane diacetal, 3,5-dimethylorthophthalaldehyde trimethylolpropane diacetal, 4,5-dimethylorthophthalaldehyde trimethylolpropane diacetal, 3,6-dichloroorthophthalaldehyde trimethylolpropane diacetal, 3,6-dibromoorthophthalaldehyde trimethylolpropane diacetal, 3,6-diethyl-4-methylorthophthalaldehyde trimethylolpropane diacetal, 3-hexylorthophthalaldehyde trimethylolpropane diacetal, 3-butyloxyorthophthalaldehyde trimethylolpropane diacetal, 3-methoxyorthophthalaldehyde trimethylolpropane diacetal, 3-methoxy-6-methylorthophthalaldehyde trimethylolpropane diacetal, 3-methyl-6-methoxyorthophthalaldehyde trimethylolpropane diacetal, 3,6-dimethoxyorthophthalaldehyde trimethylolpropane diacetal, 3-methoxy-6-ethylorthophthalaldehyde trimethylolpropane diacetal, 3,6-dimethyl-4-methoxyorthophthalaldehyde trimethylolpropane diacetal, and 3,6-dimethoxy-4-methylorthophthalaldehyde trimethylolpropane diacetal. Among these, preferred compounds may include orthophthalaldehyde trimethylolpropane diacetal, orthophthalaldehyde trimethylolethane diacetal, 3-methylorthophthalaldehyde trimethylolethane diacetal, 3-methylorthophthalaldehyde trimethylolpropane diacetal, 4-methylorthophthalaldehyde trimethylolpropane diacetal, and 4-methylorthophthalaldehyde trimethylolethane diacetal; and particularly preferred compounds may include orthophthalaldehyde trimethylolpropane diacetal and orthophthalaldehyde trimethylolethane diacetal.

The method for producing the compound represented by the general formula (1) is not particularly limited, and for example, as shown in the following <Reaction Formula 1>, the compound represented by the general formula (1) can be produced through a step of allowing a compound represented by the following general formula (3) to react with a compound represented by the following general formula (4) (acetalization reaction).

<Reaction Formula 1>

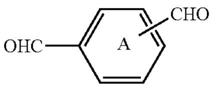

+

(3)

-continued

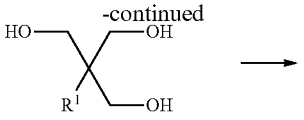

(4)

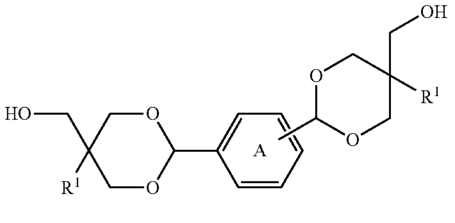

(1)

wherein $R^1$ and ring A are as defined above.

Specifically, the compound represented by the general formula (1) can be produced by allowing the compound represented by the general formula (3) to react with the compound represented by the general formula (4) in the presence of an acid catalyst (acetalization reaction).

In general, the reaction can be carried out in a solvent (e.g. toluene, etc.). The reaction can be carried out, while the solvent is heated to reflux and the generated water is subjected to azeotropy with the solvent and is removed. The acid catalyst is not particularly limited, as long as it has a catalytic action, and a known acid catalyst is used. Examples of the acid catalyst may include: mineral acids such as hydrochloric acid, sulfuric acid, nitric acid, and phosphoric acid; organic acids such as p-toluenesulfonic acid, methanesulfonic acid, ethanesulfonic acid, trifluoroacetic acid, and trifluoromethanesulfonic acid; solid acids such as cation exchange resin, zeolite, silica alumina, and heteropoly acid (e.g. phosphotungstic acid, phosphomolybdic acid, etc.); and various types of Lewis acids.

The used amount of the compound represented by the general formula (4) is generally about 0.5 to 3 moles, and preferably about 0.8 to 2 moles, with respect to 1 mole of the compound represented by the general formula (3).

The compound represented by the general formula (1a), the compound represented by the general formula (1b), and the compound represented by the general formula (1c), which are included in the compound represented by the general formula (1), can also be produced in the same manner as that of <Reaction Formula 1>.

As shown in the following <Reaction Formula 2>, the compound represented by the general formula (1a) can be produced by allowing the compound represented by the following general formula (3a) to react with the compound represented by the following general formula (4) in the presence of an acid catalyst (acetalization reaction).

<Reaction Formula 2>

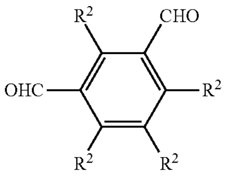

+

(3a)

-continued

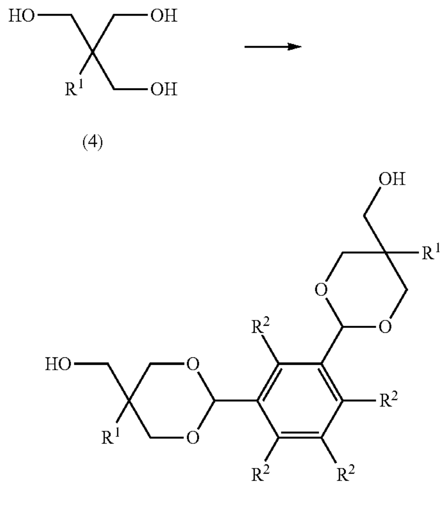

(4)

(1a)

wherein $R^1$ and $R^2$ are as defined above.

As shown in the following <Reaction Formula 3>, the compound represented by the general formula (1b) can be produced by allowing the compound represented by the following general formula (3b) to react with the compound represented by the following general formula (4) in the presence of an acid catalyst (acetalization reaction).

<Reaction Formula 3>

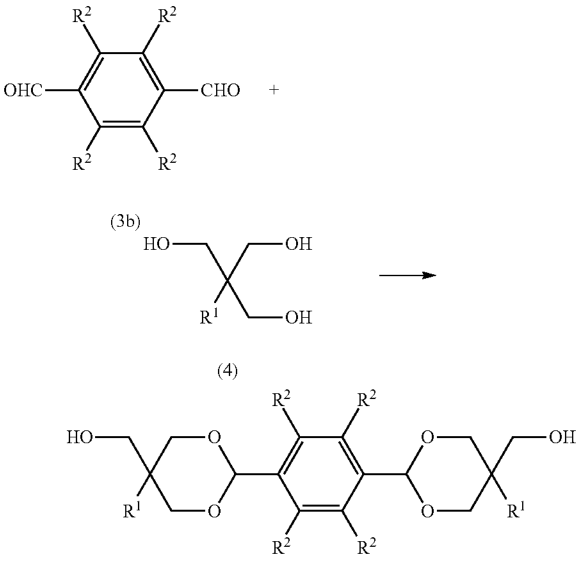

(3b)

(4)

(1b)

wherein $R^1$ and $R^2$ are as defined above.

As shown in the following <Reaction Formula 4>, the compound represented by the general formula (1c) can be produced by allowing the compound represented by the following general formula (3c) to react with the compound represented by the following general formula (4) in the presence of an acid catalyst (acetalization reaction).

<Reaction Formula 4>

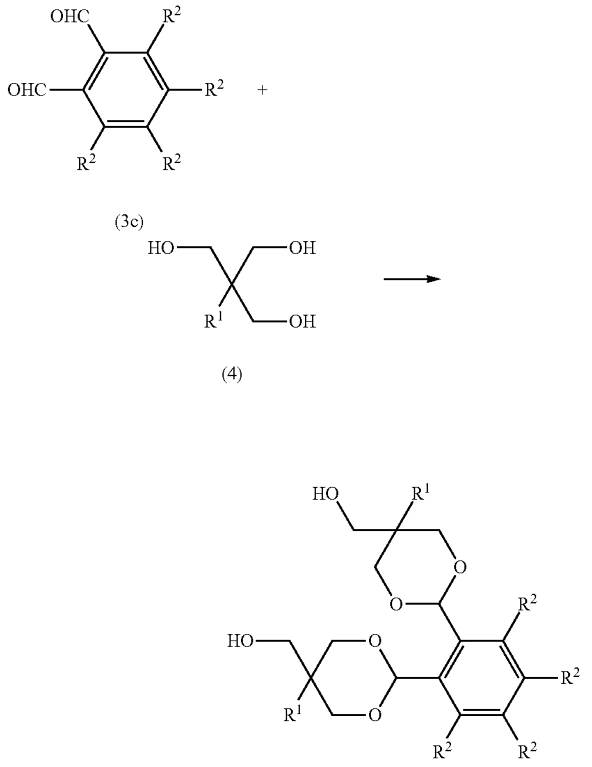

(3c)

(4)

(1c)

wherein $R^1$ and $R^2$ are as defined above.

The thermoplastic resin of one embodiment of the present invention is not particularly limited, and examples of the thermoplastic resin may include a polyester resin, a polycarbonate resin, a polyester carbonate resin, an epoxy resin, a polyurethane resin, a polyacrylic acid ester resin, and a polymethacrylic acid ester resin. The thermoplastic resin of one embodiment of the present invention is preferably a polycarbonate resin or a polyester carbonate resin. The thermoplastic resin of one embodiment of the present invention more preferably comprises the constituent unit (A) represented by the following formula, and particularly preferably comprises at least one of the constituent units (A1), (A2) and (A3) represented by the following formulae.

(A)

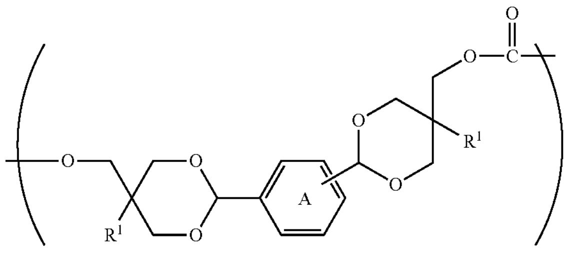

wherein $R^1$ and ring A are the same as those in the above general formula (1).

(A1)

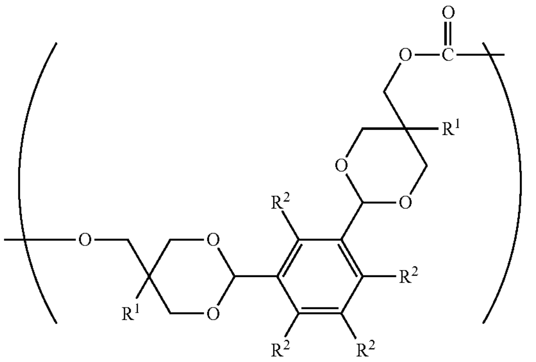

wherein $R^1$ and $R^2$ are the same as those in the above general formula (1a).

(A2)

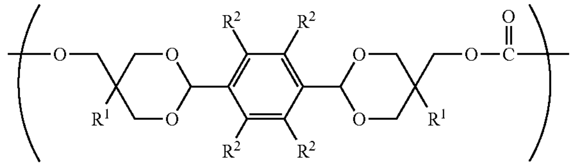

wherein $R^1$ and $R^2$ are the same as those in the above general formula (1b).

(A3)

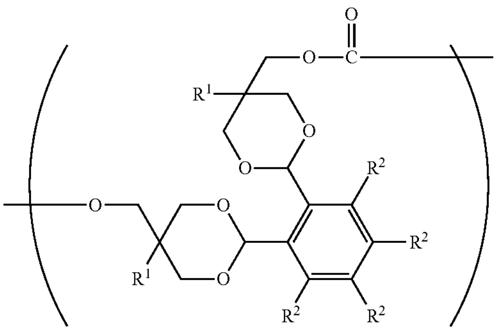

wherein $R^1$ and $R^2$ are the same as those in the above general formula (1c).

In the thermoplastic resin of one embodiment of the present invention, the ratio of the constituent unit (A) represented by the above formula in all constituent units is not particularly limited. The ratio of the constituent unit (A) is preferably 1 to 80 mole %, more preferably 1 to 60 mole %, and particularly preferably 5 to 50 mole %, in all constituent units.

That is to say, the thermoplastic resin of one embodiment of the present invention may comprise constituent units derived from aliphatic dihydroxy compounds and constituent units derived from aromatic dihydroxy compounds, which are generally used as constituent units of polycarbonate resins or polyester carbonate resins, in addition to the constituent unit (A) represented by the above-described formula.

Specifically, the aliphatic dihydroxy compound includes various compounds, and particular examples thereof may include 1,4-cyclohexanedimethanol, tricyclodecanedimethanol, 1,3-adamantanedimethanol, 2,2-bis (4-hydroxycyclohexyl)-propane, 3,9-bis(2-hydroxy-1,1-dimethylethyl)-2,4,8,10-tetraoxaspiro[5.5]undecane, 2-(5-ethyl-5-hydroxymethyl-1,3-dioxan-2-yl)-2-methylpropan-1-ol, isosorbide, 1,3-propanediol, 1,4-butanediol, and 1,6-hexanediol.

The aromatic dihydroxy compound includes various compounds, and particular examples thereof may include 2,2-bis(4-hydroxyphenyl)propane[bisphenol A], bis(4-hydroxyphenyl)methane, 1,1-bis(4-hydroxyphenyl)ethane, 2,2-bis (4-hydroxy-3,5-dimethylphenyl)propane, 4,4'-dihydroxydiphenyl, bis(4-hydroxyphenyl)cycloalkane, bis (4-hydroxyphenyl)oxide, bis(4-hydroxyphenyl)sulfide, bis (4-hydroxypheny 1)sulfone, bis(4-hydroxyphenyl) sulfoxide, and bis(4-hydroxyphenyl)ketone, and bisphenoxyethanol fluorene.

Moreover, the thermoplastic resin of one embodiment of the present invention preferably comprises a constituent unit (B) derived from a monomer represented by the following formula (2).

(2)

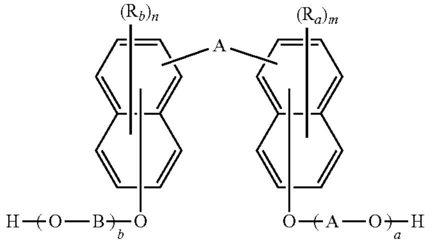

In the formula (2), $R_a$ and $R_b$ are each independently selected from the group consisting of a halogen atom, a C1-C20 alkyl group optionally having a substituent, a C1-C20 alkoxy group optionally having a substituent, a C5-C20 cycloalkyl group optionally having a substituent, a C5-C20 cycloalkoxy group optionally having a substituent, a C6-C20 aryl group optionally having a substituent, a C6-C20 heteroaryl group optionally having a substituent, which contains one or more heterocyclic atoms selected from O, N and S, a C6-C20 aryloxy group optionally having a substituent, and $—C≡C—R_h$. Herein, $R_h$ represents a C6-C20 aryl group optionally having a substituent, or a C6-C20 heteroaryl group optionally having a substituent, which contains one or more heterocyclic atoms selected from O, N and S.

$R_a$ and $R_b$ are preferably a hydrogen atom, a C6-C20 aryl group optionally having a substituent, or a C6-C20 heteroaryl group optionally having a substituent, which contains one or more heterocyclic atoms selected from O, N and S; more preferably a hydrogen atom or a C6-C20 aryl group optionally having a substituent; and further preferably a hydrogen atom or a C6-C12 aryl group optionally having a substituent.

In the formula (2), X represents a single bond or a fluorene group optionally having a substituent. X is preferably a single bond, or a fluorene group optionally having a substituent, in which a total carbon number is 12 to 20.

In the formula (2), A and B each independently represent a C1-C5 alkylene group optionally having a substituent, and each independently preferably represent an alkylene group containing 2 or 3 carbon atoms.

In the formula (2), m and n each independently represent an integer of 0 to 6, preferably an integer of 0 to 3, and more preferably 0 or 1.

In the formula (2), a and b each independently represent an integer of 0 to 10, preferably an integer of 1 to 3, and more preferably 1 or 2.

Specific examples of the constituent unit (B) may include those derived from 2,2'-bis(2-hydroxyethoxy)-1,1'-binaphthalene (BNE), DPBHBNA, and the like.

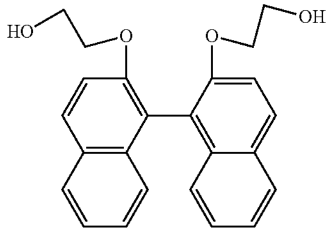

(BNE)

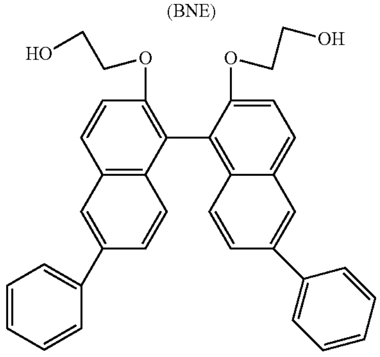

(DPBHBNA)

Furthermore, the thermoplastic resin of one embodiment of the present invention preferably has a constituent unit (C) derived from a monomer represented by the following formula (3).

(3)

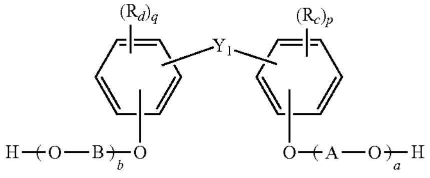

In the formula (3), $R_c$ and $R_d$ are each independently selected from the group consisting of a halogen atom, a C1-C20 alkyl group optionally having a substituent, a C1-C20 alkoxy group optionally having a substituent, a C5-C20 cycloalkyl group optionally having a substituent, a C5-C20 cycloalkoxy group optionally having a substituent, and a C6-C20 aryl group optionally having a substituent.

$R_c$ and $R_d$ are preferably a hydrogen atom, a C6-C20 aryl group optionally having a substituent, or a C6-C20 heteroaryl group optionally having a substituent, which contains one or more heterocyclic atoms selected from O, N and S; more preferably a hydrogen atom or a C6-C20 aryl group optionally having a substituent; and further preferably a hydrogen atom or a C6-C12 aryl group optionally having a substituent.

In the formula (3), $Y_1$ represents a single bond, a fluorene group optionally having a substituent, or any one of structural formulae represented by the following formulae (4) to (10); and preferably represents a single bond or a structural formula represented by the following formula (4).

(4)

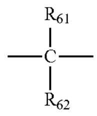

(5)

$$-S-$$

(6)

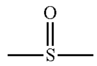

(7)

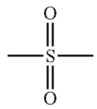

(8)

$$-(CH_2)_r-$$

(9)

$$-O-$$

(10)

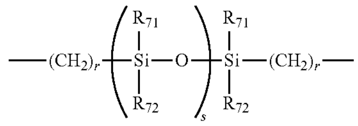

In the formulae (4) to (10), $R_{61}$, $R_{62}$, $R_{71}$ and $R_{72}$ each independently represent a hydrogen atom, a halogen atom, a C1-C20 alkyl group optionally having a substituent, or a C6-C30 aryl group optionally having a substituent, or represent a C1-C20 carbon ring or heterocyclic ring optionally having a substituent, which is formed by the binding between $R_{61}$ and $R_{62}$ or the binding between $R_{71}$ and $R_{72}$.

In the formulae (4) to (10), r and s each independently represent an integer of 0 to 5000.

In the formula (3), A and B each independently represent a C1-C5 alkylene group optionally having a substituent, or each independently preferably represent an alkylene group containing 2 or 3 carbon atoms. In the formula (3), p and q each independently represent an integer of 0 to 4, and preferably 0 or 1. In addition, in the formula (3), a and b each independently represent an integer of 0 to 10, preferably an integer of 0 to 5, more preferably an integer of 0 to 2, and for example, 0 or 1.

Specific examples of the constituent unit (C) may include those derived from BPEF (9,9-bis(4-(2-hydroxyethoxy)phenyl)fluorene), BPPEF (9,9-bis(4-(2-hydroxyethoxy)-3-phenylphenyl)fluorene), 9,9-bis[6-(2-hydroxyethoxy)naphthalen-2-yl]fluorene (BNEF), bisphenol A, bisphenol AP, bisphenol AF, bisphenol B, bisphenol BP, bisphenol C, bis(4-hydroxyphenyl)-2,2-dichloroethylene, bisphenol E, bisphenol F, bisphenol G, bisphenol M, bisphenol S, bisphenol P, bisphenol PH, bisphenol TMC, bisphenol P-AP (4,4'-(1-phenylethylidene)bisphenol), bisphenol P-CDE (4,4'-cyclododecylidenebisphenol), bisphenol P-HTG (4,4'-(3,3,5-trimethylcyclohexylidene)bisphenol), bisphenol P-MIBK (4,4'-(1,3-dimethylbutylidene)bisphenol), bisphenol PEO-FL (bisphenoxyethanolfluorene), bisphenol P-3MZ (4-[1-(4-hydroxyphenyl)-3-methylcyclohexyl]phenol), bisphenol OC-FL (4,4'-[1-[4-[1-(4-hydroxyphenyl)-1-methylethyl]phenyl]ethylidene]bisphenol), bisphenol Z, BP-2EO (2,2'-[[1,1'-biphenyl]-4,4'-diylbis(oxy)bisethanol), S-BOC (4,4'-(1-methylethydene)bis(2-methylphenol)), and TrisP-HAP (4,4',4"-ethylidenetrisphenol). Among these, the constituent units (C) are preferably those derived from BPEF or BNEF.

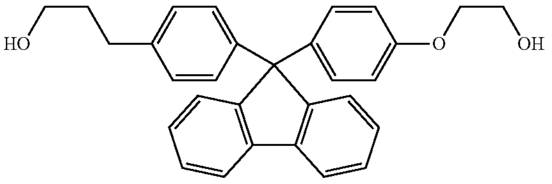

(BPEF)

-continued

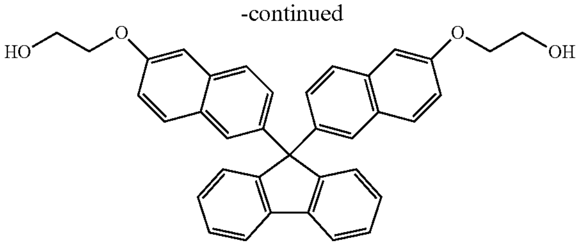

(BNEF)

The thermoplastic resin of one embodiment of the present invention essentially comprises the constituent unit (A). The thermoplastic resin of one embodiment of the present invention may also be a polymer that contains the constituent unit (B) and does not contain the constituent unit (C), a polymer that contains the constituent unit (C) and does not contain the constituent unit (B), a copolymer having the constituent unit (B) and the constituent unit (C), a mixture of a polymer having the constituent unit (B) and a polymer having the constituent unit (C), or a combination thereof. Examples of the polymer that contains the constituent unit (C) and does not contain the constituent unit (B) may include those having constituent units represented by the following formulae (I-1) to (I-3). Examples of the copolymer having the constituent unit (B) and the constituent unit (C) may include those having constituent units represented by formulae (II-1) to (II-4) as shown below.

(I-1)

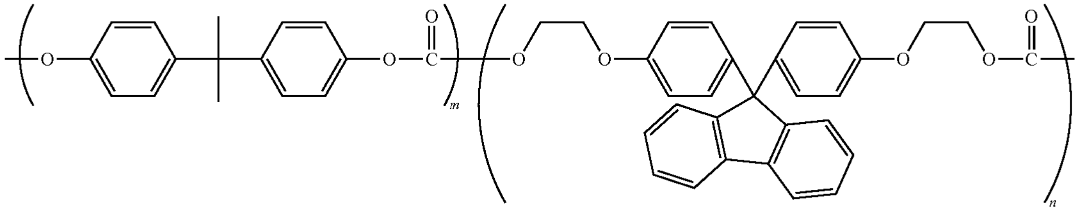

(I-2)

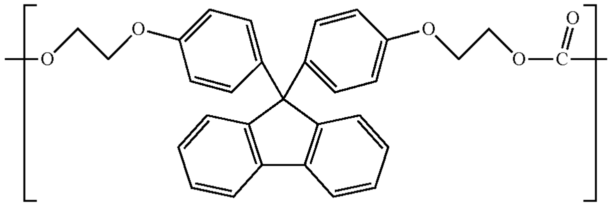

(I-3)

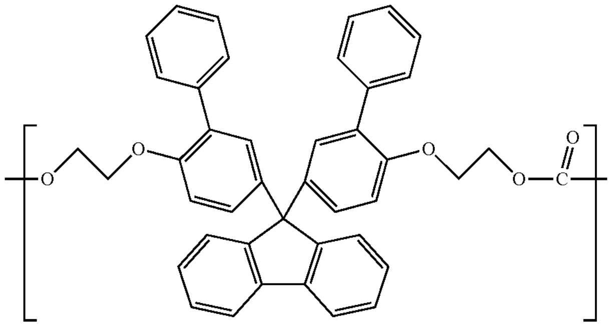

In the formula (1-1), m and n each represent an integer of 1 to 10, preferably an integer of 1 to 5, and more preferably 1; and the number of repeating units of the formula (1-3) is an integer of 1 to 10, preferably an integer of 1 to 5, and more preferably 1.

Moreover, as a polymer having multiple types of constituent units, both a block copolymer, in which the values of m and n are large (for example, 100 or more), and a random copolymer, may be adopted. Of these, a random copolymer is preferable, and more preferably, a random copolymer, in which the values of m and n are 1, is used.

(II-1)
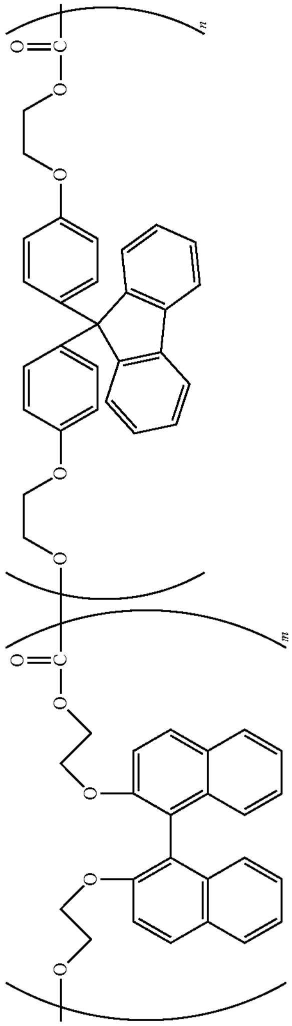
(II-2)
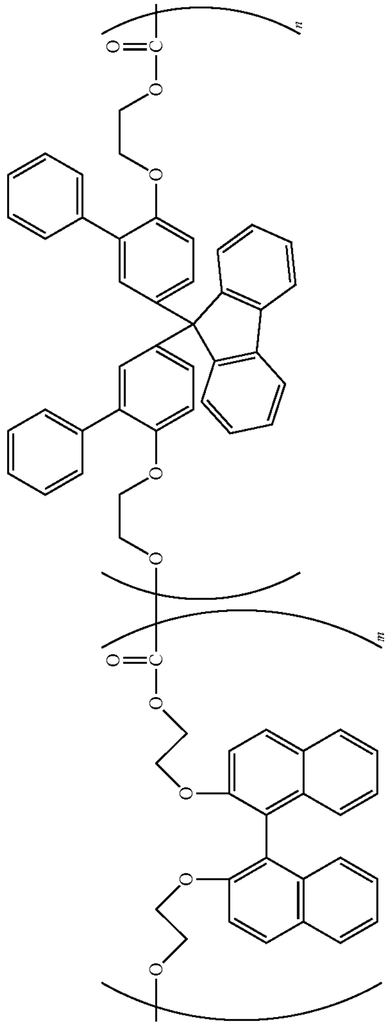
(II-3)
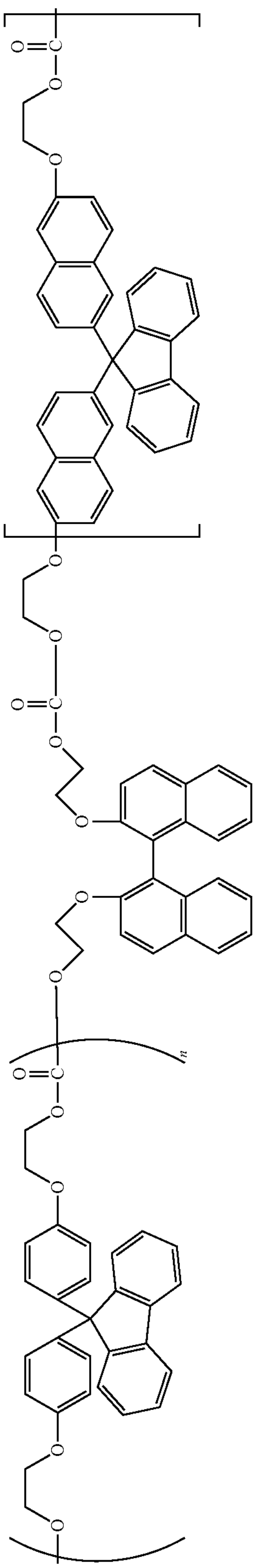

-continued
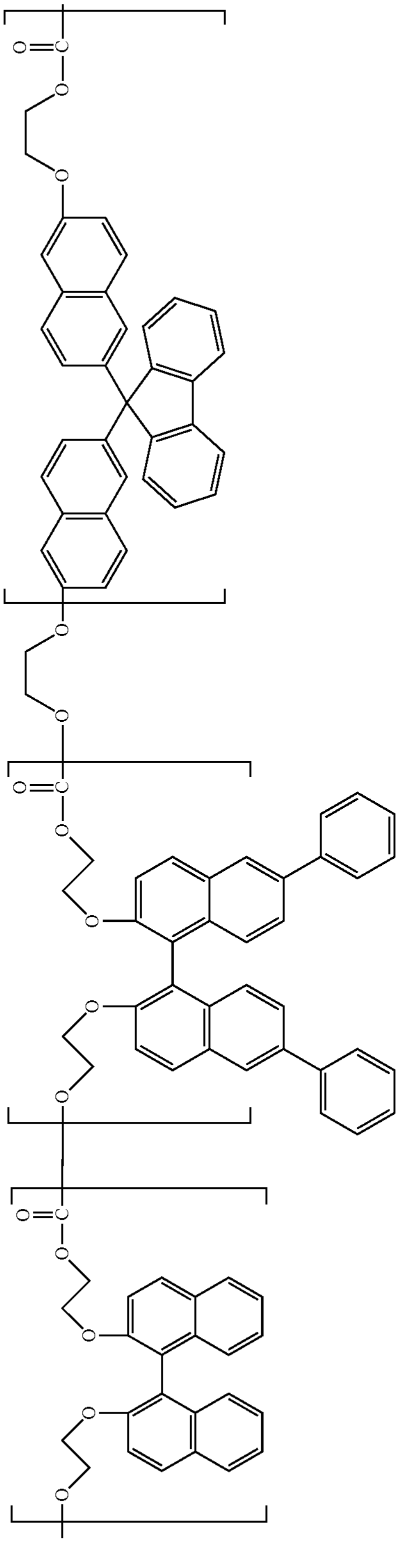
(II-4)

In the above formulae (II-1) to (II-4), m and n each independently represent an integer of 1 to 10, preferably an integer of 1 to 5, and more preferably 1.

Furthermore, as a polymer having multiple types of constituent units, both a block copolymer, in which the values of m and n are large (for example, 100 or more), and a random copolymer, may be adopted. Of these, a random copolymer is preferable, and more preferably, a random copolymer, in which the values of m and n are 1, is used.

In such a copolymer, the molar ratio between the constituent unit (B) and the constituent unit (C) is preferably 1:99 to 99:1, more preferably 10:90 to 90:10, further preferably 15:85 to 8:15, and particularly preferably 30:70 to 70:30. In addition, in the mixture, the mass ratio between a polymer having the constituent unit (B) and a polymer having the constituent unit (C) is preferably 1:99 to 99:1, more preferably 10:90 to 90:10, further preferably 15:85 to 85:15, and particularly preferably 30:70 to 70:30.

Also, the thermoplastic resin of one embodiment of the present invention preferably comprises a constituent unit derived from at least one monomer selected from the following monomer group.

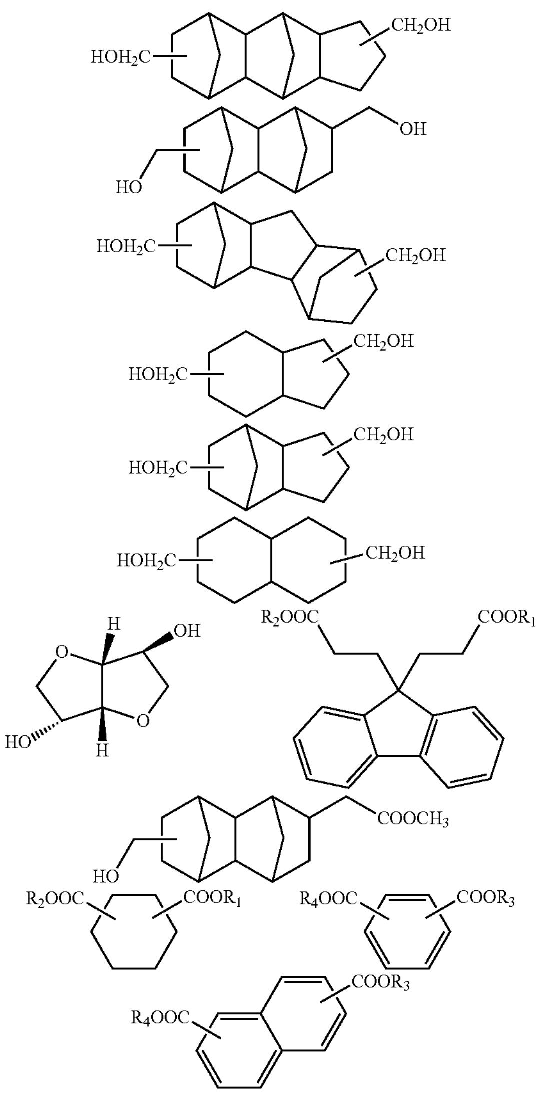

In the above formulae, $R_1$ and $R_2$ each independently represent a hydrogen atom, a methyl group, or an ethyl group, and $R_3$ and $R_4$ each independently represent a hydrogen atom, a methyl group, an ethyl group, or alkylene glycol containing 2 to 5 carbon atoms.

The polycarbonate resin of one preferred embodiment of the present invention may comprise, as impurities, an alcoholic compound that may be generated as a by-product upon the production thereof, such as a phenolic compound, or a diol component or a carbonic acid diester that has not reacted and remains, in some cases.

Such an alcoholic compound such as a phenolic compound, and such a carbonic acid diester, which are comprised as impurities, may cause a reduction in the strength of the resulting molded body or generation of odors. Accordingly, the smaller the contents of these compounds, the better.

The content of the remaining phenolic compound is preferably 3000 ppm by mass or less, more preferably 1000 ppm by mass or less, particularly preferably 300 ppm by mass or less, with respect to 100% by mass of the polycarbonate resin.

The content of the remaining diol component is preferably 1000 ppm by mass or less, more preferably 100 ppm by mass or less, and particularly preferably 10 ppm by mass or less, with respect to 100% by mass of the polycarbonate resin.

The content of the remaining carbonic acid diester is preferably 1000 ppm by mass or less, more preferably 100 ppm by mass or less, and particularly preferably 10 ppm by mass or less, with respect to 100% by mass of the polycarbonate resin.

In particular, it is preferable that the contents of compounds such as phenol and t-butyl phenol are small, and it is preferable that the contents of these compounds are within the above-described range.

The content of a phenolic compound remaining in the polycarbonate resin can be measured by a method of analyzing a phenolic compound extracted from the polycarbonate resin, using gas chromatography.

The content of an alcoholic compound remaining in the polycarbonate resin can also be measured by a method of analyzing an alcoholic compound extracted from the polycarbonate resin, using gas chromatography.

The contents of a diol component and a carbonic acid diester remaining in the polycarbonate resin can also be measured by a method of extracting these compounds from the polycarbonate resin, and then analyzing them using gas chromatography.

The contents of a by-product alcoholic compound such as a phenolic compound, a diol component, and a carbonic acid diester may be reduced to such an extent that these compounds are undetectable. However, from the viewpoint of productivity, the polycarbonate resin may comprise very small amounts of these compounds in a range in which the compounds do not impair the effects of the present invention. In addition, plasticity can be improved upon the melting of the resin, if the resin may comprise very small amounts of the compounds.

The content of the remaining phenolic compound, diol component or carbonic acid diester may each be, for example, 0.01 ppm by mass or more, 0.1 ppm by mass or more, or 1 ppm by mass or more, with respect to 100% by mass of the poly carbonate resin.

The content of the remaining alcoholic compound may be, for example, 0.01 ppm by mass or more, 0.1 ppm by mass or more, or 1 ppm by mass or more, with respect to 100% by mass of the poly carbonate resin.

Besides, the contents of the by-product alcoholic compound such as a phenolic compound, the diol component and the carbonic acid diester in the polycarbonate resin can be regulated to be within the above-described ranges by appropriately adjusting conditions for polycondensation or the setting of apparatuses. Otherwise, the contents of these compounds can also be regulated by determining conditions for an extrusion step after completion of the polycondensation.

For example, the amount of the remaining by-product alcoholic compound such as a phenolic compound is related to the type of carbonic acid diester used in the polymerization of the polycarbonate resin, the temperature applied to the polymerization reaction, the polymerization pressure, etc. By adjusting these conditions, the amount of the remaining by-product alcoholic compound such as a phenolic compound can be reduced.

For example, when the polycarbonate resin is produced using dialkyl carbonate such as diethyl carbonate, the molecular weight is hardly increased, and low-molecular-weight polycarbonate is thereby obtained, so that the content of an alcoholic compound generated as a by-product tends to be increased. Such alkyl alcohol has high volatility, and thus, if it remains in the polycarbonate resin, the moldability of the resin tends to be deteriorated. In addition, when the amount of the remaining by-product alcoholic compound such as a phenolic compound is large, it is likely that problems regarding odor occur upon the molding of the resin, or it is also likely that the cleavage reaction of a resin skeleton progresses upon compounding, and a reduction in the molecular weight thereby occurs. Therefore, the content of the by-product alcoholic compound remaining in the obtained polycarbonate resin is preferably 3000 ppm by mass or less, with respect to the amount of the polycarbonate resin (100% by mass). The content of the remaining alcoholic compound is preferably 3000 ppm by mass or less, more preferably 1000 ppm by mass or less, and particularly preferably 300 ppm by mass or less, with respect to 100% by mass of the polycarbonate resin.

<Physical Properties of Thermoplastic Resin>

(1) Refractive Index (nD)

In one embodiment of the present invention, one characteristic of the thermoplastic resin is that it has a high refractive index. The refractive index is preferably 1.599 to 1.750, more preferably 1.599 to 1.650, and particularly preferably 1.600 to 1.650. In the present invention, the refractive index can be measured by the method described in the after-mentioned Examples.

(2) Abbe Number (v)

In one embodiment of the present invention, the Abbe number of the thermoplastic resin is preferably 25.0 to 33.0, more preferably 25.5 to 32.0, and particularly preferably 26.0 to 30.0. In the present invention, the Abbe number can be measured by the method described in the after-mentioned Examples.

(3) Glass Transition Temperature (Tg)

In one embodiment of the present invention, one characteristic of the thermoplastic resin is that it has high heat resistance. The glass transition temperature (Tg) is preferably 135° C. to 200° C., more preferably 140° C. to 180° C., and particularly preferably 140° C. to 170° C. In the present invention, the glass transition temperature can be measured by the method described in the after-mentioned Examples.

(4) Polystyrene-Converted Weight Average Molecular Weight (Mw)

In one embodiment of the present invention, the polystyrene-converted weight average molecular weight of the thermoplastic resin is preferably 10,000 to 200,000, more preferably 10,000 to 100,000, and particularly preferably 10,000 to 80,000.

<Thermoplastic Resin Composition>

Another embodiment of the present invention relates to a thermoplastic resin composition comprising the aforementioned thermoplastic resin and additives. The thermoplastic resin composition of the present embodiment may also comprise a resin other than the thermoplastic resin of the present invention comprising the aforementioned constituent unit (A), in a range in which such a resin does not impair the desired effects of the present embodiment. Such a resin is not particularly limited, and it may be, for example, at least one resin selected from the group consisting of a polycarbonate resin, a polyester resin, a polyester carbonate resin, a (meth)acrylic resin, a polyamide resin, a polystyrene resin, a cycloolefin resin, an acrylonitrile-butadiene-styrene copolymer resin, a vinyl chloride resin, a polyphenylene ether resin, a polysulfone resin, a polyacetal resin, and a methyl methacrylate-styrene copolymer resin. Various types of known resins can be used as such resins, and one type of such resin alone can be added to, or a combination of two or more types of such resins can be added to the thermoplastic resin composition.

[Antioxidant]

The thermoplastic resin composition preferably comprises an antioxidant as an additive described above.

As such an antioxidant, the thermoplastic resin composition preferably comprises at least one of a phenolic antioxidant and a phosphite-based antioxidant.

Examples of the phenolic antioxidant may include 1,3,5-tris(3,5-di-tert-butyl-4-hydroxyphenylmethyl)-2,4,6-trimethylbenzene, 1,3,5-tris(3,5-di-tert-butyl-4-hydroxybenzyl)-1,3,5-triazine-2,4,6(1H,3H, 5H)-tri one, 4,4',4"-(1-methylpropanyl-3-ylidene)tris(6-tert-butyl-m-cresol), 6,6'-di-tert-butyl-4,4'-butylidenedi-m-cresol, octadecyl 3-(3,5-di-tert-butyl-4-hydroxyphenyl)propionate, pentaerythritol-tetrakis[3-(3,5-di-tert-butyl-4-hydroxyphenyl)propionate], 3,9-bis{2-[3-(3-tert-butyl-4-hydroxy-5-methylphenyl)propionyloxy]-1,1-dimethylethyl}-2,4,8,10-tetraoxospiro[5.5]undecane, and pentaerythritol-tetrakis[3-(3,5-di-tert-butyl-4-hydroxyphenyl)propionate]. Among these, pentaerythritol-tetrakis[3-(3,5-di-tert-butyl-4-hydroxyphenyl)propionate] is preferable.

Examples of the phosphite-based antioxidant may include 2-ethylhexyl diphenyl phosphite, isodecyl diphenyl phosphite, triisodecyl phosphite, triphenyl phosphite, 3,9-bis(octadecyloxy)-2,4,8,10-tetraoxy-3,9-diphosphaspiro[5.5]undecane, 3,9-bis(2,6-di-tert-butyl-4-methylphenoxy)-2,4,8,10-tetraoxa-3,9-diphosphaspiro[5.5]undecane, 2,2'-methylenebis(4,6-di-tert-butylphenyl)2-ethylhexyl phosphite, tris(2,4-ditert-butylphenyl) phosphite, tris(nonylphenyl) phosphite, tetra-C12-15-alkyl(propane-2,2-diylbis(4,1-phenylene))bis(phosphite), and 3,9-bis(2,6-di-tert-butyl-4-methylphenoxy)-2,4,8,10-tetraoxa-3,9-diphosphaspiro[5.5]undecane. Among these, 3,9-bis(2,6-di-tert-butyl-4-methylphenoxy)-2,4,8,10-tetraoxa-3,9-diphosphaspiro[5.5]undecane is preferable.

As such antioxidants, the aforementioned compounds may be used alone as a single type, or may also be used as a mixture of two or more types.

The antioxidant is preferably comprised in the thermoplastic resin composition in an amount of 1 ppm by weight to 3000 ppm by weight, with respect to the total weight of the resin composition. The content of the antioxidant in the thermoplastic resin composition is more preferably 50 ppm by weight to 2500 ppm by weight, further preferably 100 ppm by weight to 2000 ppm by weight, particularly preferably 150 ppm by weight to 1500 ppm by weight, and further particularly preferably 200 ppm by weight to 1200 ppm by weight.

[Release Agent]

The thermoplastic resin composition preferably comprises a release agent as an additive described above.

Examples of the release agent may include ester compounds including glycerin fatty acid esters such as mono/diglyceride of glycerin fatty acid, glycol fatty acid esters such as propylene glycol fatty acid ester and sorbitan fatty acid ester, higher alcohol fatty acid esters, full esters of aliphatic polyhydric alcohol and aliphatic carboxy acid, and monofatty acid esters. When an ester of aliphatic polyhydric alcohol and aliphatic carboxy acid is used as a release agent, any of a monoester, a full ester, and the like can be adopted. For example, those other than full esters, such as a monoester, may be used.

Specific examples of the release agent may include the following substances: namely, sorbitan fatty acid esters, such as sorbitan stearate, sorbitan laurate, sorbitan oleate, sorbitan trioleate, sorbitan tribehenate, sorbitan stearate, sorbitan tristearate, and sorbitan caprylate;

propylene glycol fatty acid esters, such as propylene glycol monostearate, propylene glycol monooleate, propylene glycol monobehenate, propylene glycol monolaurate, and propylene glycol monopalmitate;

higher alcohol fatty acid esters, such as stearyl stearate;

glycerin fatty acid ester monoglycerides, which include: monoglycerides including glycerin monostearate, glycerin monohydroxystearate such as glycerin mono-12-hydroxy stearate, glycerin monooleate, glycerin monobehenate, glycerin monocaprylate, glycerin monocaprate and glycerin monolaurate; and mono/diglycerides including glycerin mono/distearate, glycerin mono/distearate, glycerin mono/dibehenate, glycerin mono/dioleate;

acetylated monoglycerides of glycerin fatty acid esters, such as glycerin diacetomonolaurate;

organic acid monoglycerides of glycerin fatty acid esters, such as citric acid fatty acid monoglyceride, succinic acid fatty acid monoglyceride, and diacetyl tartaric acid fatty acid monoglyceride; and polyglycerin fatty acid esters, such as diglycerin stearate, diglycerin laurate, diglycerin oleate, diglycerin monostearate, diglycerin monolaurate, diglycerin monomyristate, diglycerin monooleate, tetraglycerin stearate, decaglycerin laurate, decaglycerin oleate, and polyglycerin polyricinoleate.

The release agent is preferably comprised in the thermoplastic resin composition in an amount of 1 ppm by weight to 5000 ppm by weight, with respect to the total weight of the resin composition. The content of the release agent in the thermoplastic resin composition is more preferably 50 ppm by weight to 4000 ppm by weight, further preferably 100 ppm by weight to 3500 ppm by weight, particularly preferably 500 ppm by weight to 13000 ppm by weight, and further particularly preferably 1000 ppm by weight to 2500 ppm by weight.

[Other Additives]

Additives other than the aforementioned antioxidant and release agent may also be added to the thermoplastic resin composition. Examples of the additives that may be comprised in the thermoplastic resin composition may include a compounding agent, a catalyst inactivator, a thermal stabilizer, a plasticizer, a filler, an ultraviolet absorber, a rust inhibitor, a dispersant, an antifoaming agent, a leveling agent, a flame retardant, a lubricant, a dye, a pigment, a bluing agent, a nucleating agent, and a clearing agent.

The content of additives other than the antioxidant and the release agent in the thermoplastic resin composition is preferably 10 ppm by weight to 5.0% by weight, more preferably 100 ppm by weight to 2.0% by weight, and further preferably 1000 ppm by weight to 1.0% by weight, but is not limited thereto.

The aforementioned additives are likely to adversely affect transmittance. Thus, it is preferable not to add such additives excessively, and more preferably, the total additive amount is, for example, within the aforementioned range.

Further, another embodiment of the present invention relates to a thermoplastic resin composition comprising a modifier represented by the following general formula (1) and a thermoplastic resin:

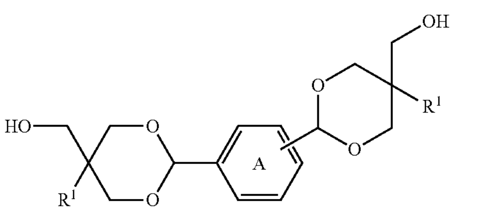

(1)

wherein $R^1$ and ring A are the same as those in the aforementioned general formula (1). That is to say, a novel cyclic diol compound represented by the general formula (1) can also be used as a modifier.

In one embodiment of the present invention, the above-described modifier can be mixed with the thermoplastic resin, so that the mass ratio between the thermoplastic resin and the modifier becomes the thermoplastic resin:the modifier=99.90.1 to 70:30. The mass ratio may be preferably 99:1 to 70:30, and more preferably 98:2 to 70:30, and it may be, for example, 99:1, 98:2, 97:3, 96:4, 95:5, 94:6, 93:7, 92:8, 91:9, 90:10, 85:15, 80:20, 75:25, 70:30, or the like. In the present invention, if the mass ratio between the thermoplastic resin and the modifier is within the above-described range, a resin composition having high fluidity and good moldability can be provided.

<Optical Member>

The thermoplastic resin or the thermoplastic resin composition of the present invention (hereinafter simply abbreviated as a "resin composition") can be preferably used in an optical member. In one embodiment of the present invention, an optical member comprising the resin composition of the present invention is provided. In one embodiment of the present invention, the optical member may include, but is not limited to, an optical disk, a transparent conductive substrate, an optical card, a sheet, a film, an optical fiber, a lens, a prism, an optical film, a substrate, an optical filter, a hard coat film, and the like. The resin composition of the present invention has high fluidity, and can be molded according to a cast method. Hence, the present resin composition is preferably used, in particular, in production of a thin optical member. In a preferred embodiment of the present invention, the optical member produced using the resin composition of the present invention may be an optical lens. In another preferred embodiment of the present invention, the optical member produced using the resin composition of the present invention may be an optical film.

When an optical member comprising the resin composition of the present invention is produced according to injection molding, the optical member is preferably molded under conditions of a cylinder temperature of 260° C. to 350° C. and a mold temperature of 90° C. to 170° C. The optical member is more preferably molded under conditions of a cylinder temperature of 270° C. to 320° C. and a mold temperature of 100° C. to 160° C. When the cylinder temperature is higher than 350° C., the resin composition is decomposed and colored. On the other hand, when the cylinder temperature is lower than 260° C., the melt viscosity becomes high, and it easily becomes difficult to mold the optical member. Moreover, when the mold temperature is higher than 170° C., it easily becomes difficult to remove a molded piece consisting of the resin composition from a mold. On the other hand, when the mold temperature is lower than 90° C., the resin is hardened too quickly in a mold upon the molding thereof, and it becomes difficult to control the shape of a molded piece, or it easily becomes difficult to sufficiently transcribe a vehicle placed in a mold.

<Optical Lens>

In one embodiment of the present invention, the resin composition can be preferably used in an optical lens. Since the optical lens produced using the resin composition of the present invention has a high refractive index and is excellent in terms of heat resistance, it can be used in fields in which expensive glass lenses having a high refractive index have been conventionally used, such as telescopes, binoculars and TV projectors, and thus, the optical lens produced using the present resin composition is extremely useful.

For instance, regarding a lens used for smart phones, a lens molded from a thermoplastic resin comprising the constituent unit (A) is overlapped with a lens molded from a resin comprising the constituent unit represented by any one of the formulae (II-1) to (II-4) or a resin comprising a constituent unit derived from a monomer represented by any one of the following formulae, so that the lenses can be used as a lens unit:

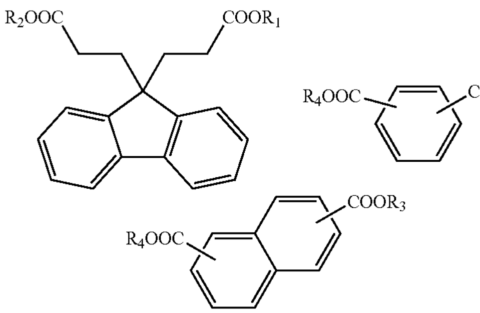

wherein $R_1$ and $R_2$ each independently represent a hydrogen atom, a methyl group or an ethyl group, and $R_3$ and $R_4$ each independently represent a hydrogen atom, a methyl group, an ethyl group or alkylene glycol containing 2 to 5 carbon atoms.

The optical lens of the present invention is preferably used in the shape of an aspherical lens, as necessary. Since the aspherical lens can reduce spherical aberration to substantially zero with a single lens thereof, it is not necessary to eliminate the spherical aberration by a combination of a plurality of spherical lenses, and thereby, it becomes possible to achieve weight saving and a reduction in production costs. Therefore, among the optical lenses, the aspherical lens is particularly useful as a camera lens.

Moreover, since the optical lens of the present invention has high molding fluidity, the present optical lens is particularly useful as a material of a thin and small optical lens having a complicated shape. Regarding the specific size of a lens, the thickness of the central portion is preferably 0.05 to 3.0 mm, more preferably 0.05 to 2.0 mm, and further preferably 0.1 to 2.0 mm. In addition, the diameter is preferably 1.0 mm to 20.0 mm, more preferably 1.0 to 10.0 mm, and further preferably, 3.0 to 10.0 mm. Further, regarding the shape thereof, the optical lens of the present invention is preferably a meniscus lens, in which one surface is a convex, and the other surface is a concave.

The optical lens of the present invention is molded according to any given method such as die molding, cutting, polishing, laser machining, electrical discharge machining, or etching. Among these methods, die molding is more preferable in terms of production costs.

<Optical Film>

In one embodiment of the present invention, the resin composition can be preferably used in optical films. In particular, since the optical film produced using the polycarbonate resin of the present invention is excellent in terms of transparency and heat resistance, it can be preferably used for films for use in liquid crystal substrates, optical memory cards, etc.

In order to avoid the mixing of foreign matters into the optical lens, the molding environment must be naturally a low-dust environment, and the class is preferably 6 or less, and more preferably 5 or less.

EXAMPLES

Hereinafter, the examples of the present invention will be shown together with comparative examples, and the contents of the invention will be described in detail. However, the present invention is not limited to these examples.

<Used Compounds>

Isophthalaldehyde: manufactured by Tokyo Chemical Industry Co., Ltd.

Terephthalaldehyde: manufactured by Tokyo Chemical Industry Co., Ltd.

Orthophthalaldehyde:manufactured by Tokyo Chemical Industry Co., Ltd.

p-Toluenesulfonic acid monohydrate: manufactured by Nacalai Tesque, Inc.

Trimethylolethane and Trimethylolpropane: manufactured by Tokyo Chemical Industry Co., Ltd.

Bisphenoxy ethanol fluorene (BPEF): manufactured by Tokyo Chemical Industry Co., Ltd.

Diphenyl carbonate: manufactured by Tokyo Chemical Industry Co., Ltd.

<Analysis According to Gas Chromatography (GC)>

The purity of a cyclic diol compound was obtained by performing gas chromatographic (GC) analysis according to the following conditions and methods, and then applying an area normalization method.

(Preparation of Sample)

Methanol (50 ml) was added to 0.5 g of a cyclic diol compound, followed by shaking and mixing at room temperature to prepare a methanol solution containing the cyclic diol compound, which was then used as a sample for analysis.

[Measurement Conditions]

Apparatus: GC-2020, manufactured by Shimadzu Corporation

Column: DB-1, 30 m×0.25 mm×0.25 μm, manufactured by Agilent Technologies Japan, Ltd.

Column temperature: 80° C. (retention time: 5 min)—temperature—increasing rate: 10° C./min—320° C. (retention time: 5 min)

Injection temperature/detector temperature: 300° C./325° C.

Split ratio: 30

Column flow rate:1.17 ml/min

Purge flow rate: 10.0 ml/min

Detector: FID

Carrier gas: helium

Linear gas velocity: 30 cm/sec

Amount injected: 1 μl

<Melting Point>

The melting point of a cyclic diol compound was measured using the differential scanning calorimeter DSC6220 manufactured by SII NanoTechnology Inc. A sample (10.7 mg) was placed in an aluminum pan manufactured by SII NanoTechnology Inc., and was then hermetically sealed. Thereafter, the temperature of the device was increased from 30° C. to 200° C. under a nitrogen stream of 50 ml/min at a temperature-increasing rate of 10° C./min, and the endothermic peak was then measured. The temperature of the peak top was defined as a melting point.

<Infrared Absorption Spectrum (IR Spectrum)>

The IR spectrum of a cyclic diol compound was obtained using an infrared spectrometer (Spectrum400, manufactured by PerkinElmer Japan Co., Ltd.) according to an ATR method (attenuated total reflection method).

<Refractive Index (nD)>

A polycarbonate resin was molded according to JIS B 7071-2: 2018, to obtain a V block, which was then used as a test piece. The refractive index (nD) was measured at 23° C. using a refractometer (KPR-3000, manufactured by Shimadzu Corporation).

<Abbe Number (ν)>

The same test piece (V block) as that used in the measurement of a refractive index was used, and the refractive indexes at wavelengths of 486 nm, 589 nm, and 656 nm were measured at 23° C. using a refractometer. Thereafter, the Abbe number was calculated according to the following equation:

$$\nu=(nD-1)/(nF-nC),$$

wherein nD: refractive index at a wavelength of 589 nm, nC: refractive index at a wavelength of 656 nm, and nF: refractive index at a wavelength of 486 nm.

<Glass Transition Temperature (Tg)>

The glass transition temperature (Tg) was measured according to JIS K7121-1987, using a differential scanning calorimeter (X-DSC7000, Hitachi High-Tech Science Corporation) by a temperature-increasing program of 10° C./min.

<Weight Average Molecular Weight (Mw)>

The weight average molecular weight of a resin was measured by applying gel permeation chromatography (GPC) and then calculating the weight average molecular weight in terms of standard polystyrene. The used apparatus, columns and measurement conditions are as follows.

GPC apparatus: HLC-8420GPC, manufactured by Tosoh Corporation

Columns: TSKgel SuperHM-M×3, manufactured by Tosoh Corporation

TSKgel guard column SuperH-H×1, manufactured by Tosoh Corporation

TSKgel SuperH-RC×1, manufactured by Tosoh Corporation

Detector: RI Detector

Standard polystyrene: Standard Polystyrene Kit PStQuick C, manufactured by Tosoh Corporation Sample solution: 0.2 mass % Tetrahydrofuran solution The sample solution was filtrated through a syringe filter (GL ChromatoDisk, manufactured by GL Sciences; pore diameter: 0.45 μm), and was then poured into the column.

Eluent: Tetrahydrofuran

Eluent flow rate: 0.6 mL/min

Column temperature: 40° C.

Synthetic Example 1

To a 500-mL four-necked flask equipped with a stirrer, a thermometer and a Dean-Stark apparatus with a cooling pipe, 13.4 g (0.1 mol) of isophthalaldehyde, 0.67 g of p-toluenesulfonic acid monohydrate, 26.4 g (0.22 mol) of trimethylolethane, 60 ml of toluene, and 60 ml of N,N-dimethylformamide were added. Thereafter, the temperature of the mixture was increased, and the obtained mixture was stirred for about 6 hours under reflux conditions, while the generated water was removed. Thereafter, the temperature of the reaction mixture was returned to room temperature, and the reaction mixture was then neutralized with 1 g of triethylamine. After that, 59 ml of toluene was distilled away under reduced pressure, and 100 g of ion exchange water was then added to the reaction mixture, followed by cooling with ice water. The generated crystals were separated by filtration, and the obtained crystals were first rinsed with 50 ml of ion exchange water twice, and were then rinsed with 100 ml of hot water at 60° C. twice. Finally, the crystals were rinsed with 50 ml of ion exchange water twice. The wet crystals were dried under reduced pressure at 80° C., so as to obtain 26.7 g (0.08 mol) of isophthalaldehyde trimethylolethane diacetal having a purity of 99.7 GC area %. The melting point of the crystals was 165.9° C.

The IR spectrum of the obtained isophthalaldehyde trimethylolethane diacetal was measured, and as a result, the obtained compound was confirmed to be isophthalaldehyde trimethylolethane diacetal.

IR ($cm^{-1}$): 653, 690, 714, 803, 891, 962, 982, 1007, 1024, 1043, 1100, 1164, 1378, 2866, 2955, 3349

Synthetic Example 2

To a 500-mL four-necked flask equipped with a stirrer, a thermometer and a Dean-Stark apparatus with a cooling pipe, 13.4 g (0.1 mol) of isophthalaldehyde, 0.67 g of p-toluenesulfonic acid monohydrate, 29.5 g (0.22 mol) of trimethylolpropane, 60 ml of toluene, and 60 ml of N,N-dimethylformamide were added. Thereafter, the temperature of the mixture was increased, and the obtained mixture was stirred for about 8 hours under reflux conditions, while the generated water was removed. Thereafter, the temperature of the reaction mixture was returned to room temperature, and the reaction mixture was then neutralized with 1 g of triethylamine. After that, 60 ml of toluene was distilled away under reduced pressure, and 150 g of ion exchange water was then added to the reaction mixture, followed by cooling with ice water. The generated crystals were separated by filtration, and the obtained crystals were first rinsed with 50 ml of ion exchange water twice, and were then rinsed with 100 ml of hot water at 60° C. twice. Finally, the crystals were rinsed with 50 ml of ion exchange water twice. The wet crystals were dried under reduced pressure at 80° C., so as to obtain isophthalaldehyde trimethylolpropane diacetal having a purity of 92.7 GC area %. Thereafter, 60 g of isopropyl alcohol was added to the obtained crystals, and the crystals were then melted by heating. After that, 40 g of isopropyl alcohol was distilled away, and 100 ml of water was added thereto. The precipitated crystals were separated by filtration, the crystals were then rinsed with 50 ml of ion exchange water twice, and the wet crystals were dried under reduced pressure at 80° C., so as to obtain 27.0 g (0.07 mol) of isophthalaldehyde trimethylolpropane diacetal having a purity of 98.5 GC area %. The melting point of the crystals was 95.5° C.

The IR spectrum of the obtained isophthalaldehyde trimethylolpropane diacetal was measured, and as a result, the obtained compound was confirmed to be isophthalaldehyde trimethylolpropane diacetal.

IR ($cm^{-1}$): 712, 803, 933, 971, 1030, 1101, 1165, 1377, 2859, 2962, 3374

Synthetic Example 3

To a 500-mL four-necked flask equipped with a stirrer, a thermometer and a Dean-Stark apparatus with a cooling pipe, 13.4 g (0.1 mol) of terephthalaldehyde, 0.67 g of p-toluenesulfonic acid monohydrate, 26.4 g (0.22 mol) of trimethylolethane, 60 ml of toluene, and 60 ml of N,N-dimethylformamide were added. Thereafter, the temperature of the mixture was increased, and the obtained mixture was stirred for about 6 hours under reflux conditions, while the generated water was removed. Thereafter, the temperature of the reaction mixture was returned to room temperature, and the reaction mixture was then neutralized with 1 g of triethylamine. After that, 50 ml of toluene was distilled away under reduced pressure, and 100 g of ion exchange water was then added to the reaction mixture, followed by cooling with ice water. The generated crystals were separated by filtration, and the obtained crystals were first rinsed with 50 ml of ion exchange water twice, and were then rinsed with 50 ml of hot water at 60° C. twice. The wet crystals were dried under reduced pressure at 100° C., so as to obtain 30.4 g (0.09 mol) of terephthalaldehyde trimethylolethane diacetal having a purity of 99.7 GC area %. The melting point of the crystals was 247.3° C.

The IR spectrum of the obtained terephthalaldehyde trimethylolethane diacetal was measured, and as a result, the obtained compound was confirmed to be terephthalaldehy de trimethylolethane diacetal.

IR ($cm^{-1}$): 656, 778, 804, 918, 964, 977, 993, 1016, 1042, 1094, 1374, 2844, 2933, 2959, 3413

Synthetic Example 4

To a 500-mL four-necked flask equipped with a stirrer, a thermometer and a Dean-Stark apparatus with a cooling pipe, 13.4 g (0.1 mol) of terephthalaldehyde, 0.67 g of p-toluenesulfonic acid monohydrate, 26.4 g (0.2 mol) of trimethylolpropane, 60 ml of toluene, and 60 ml of N,N-dimethylformamide were added. Thereafter, the temperature of the mixture was increased, and the obtained mixture was stirred for about 10 hours under reflux conditions, while the generated water was removed. Thereafter, the temperature of the reaction mixture was returned to room temperature, and the reaction mixture was then neutralized with 1 g of triethylamine. After that, 50 ml of toluene was distilled away under reduced pressure, and 150 g of ion exchange water was then added to the reaction mixture, followed by cooling with ice water. The generated crystals were separated by filtration, and the obtained crystals were first rinsed with 50 ml of ion exchange water twice, and were then rinsed with 50 ml of hot water at 60° C. twice. The wet crystals were dried under reduced pressure at 100° C., so as to obtain terephthalaldehyde trimethylolpropane diacetal having a purity of 96.9 GC area %. Thereafter, 140 g of isopropyl alcohol was added to the obtained crystals, and the crystals were then melted by heating. After that, isopropyl alcohol was distilled away, and the precipitated crystals were then separated by filtration. The crystals were rinsed with 50 ml of ion exchange water twice, and the wet crystals were then dried under reduced pressure at 100° C., so as to obtain 30.0 g (0.08 mol) of terephthalaldehyde trimethylolpropane diacetal having a purity of 97.0 GC area %. The melting point of the crystals was 187.2° C.

The IR spectrum of the obtained terephthalaldehyde trimethylolpropane diacetal was measured, and as a result, the obtained compound was confirmed to be terephthalaldehyde trimethylolpropane diacetal.

IR ($cm^{-1}$): 801, 971, 1000, 1018, 1099, 1379, 2855, 2928, 2967, 3355

Synthetic Example 5

To a 1000-mL four-necked flask equipped with a stirrer, a thermometer and a Dean-Stark apparatus with a cooling pipe, 40.2 g (0.3 mol) of orthophthalaldehyde, 1.0 g of p-toluenesulfonic acid monohydrate, 75.6 g (0.63 mol) of trimethylolethane, 180 ml of xylene, and 180 ml of N-methylpyrrolidone were added. Thereafter, the temperature of the mixture was increased, and the obtained mixture was stirred for about 4 hours under reflux conditions, while the generated water was removed. Thereafter, 170 ml of xylene was distilled away under reduced pressure, and the temperature of the reaction mixture was then returned to room temperature. After that, the reaction mixture was neutralized with 25 ml of saturated sodium hydrogen carbonate, and 400 g of ion exchange water was then added thereto. Thereafter, 100 ml of ethyl acetate was added to the mixture, and an organic layer was separated from a water layer, using a separatory funnel. To the separated water layer, 100 ml of ethyl acetate was added, and an organic layer was separated from a water layer. This operation was carried out two times in total. The obtained organic layer was concentrated using a rotary evaporator, so as to obtain 90.2 g (0.27 mol) of orthophthalaldehyde trimethylolethane diacetal having a purity of 99.2% (GC area %).

The IR spectrum of the obtained orthophthalaldehyde trimethylolethane diacetal was measured, and as a result, the obtained compound was confirmed to be orthophthalaldehyde trimethylolethane diacetal.

IR ($cm^{-1}$): 663, 698, 760, 920, 948, 969, 1003, 1021, 1042, 1082, 1099, 1203, 1386, 1455, 2850, 2955, 3414

Example 1

Raw materials, namely, 22.6470 g (0.0516 mol) of 9,9-bis[4-(2-hydroxyethoxy)phenyl]fluorene (BPEF) represented by the structural formula as shown below, 7.4982 g (0.0222 mol) of isophthalaldehyde trimethylolethane diacetal obtained in Synthetic Example 1 (hereinafter referred to as Compound 1), 16.2833 g (0.0760 mol) of diphenyl carbonate (DPC), and $0.6201\times10^{-4}$ g ($0.7381\times10^{-6}$ mol) of sodium hydrogen carbonate were placed in a 300-mL reactor equipped with a stirrer and a distillation apparatus, and the inside of the reaction system was set to be a nitrogen atmosphere at 101.3 kPa. This reactor was immersed in an oil bath heated to 200° C., and an transesterification reaction was initiated. Five minutes after initiation of the reaction, stirring was started, and 20 minutes later, the pressure was reduced from 101.3 kPa to 26.66 kPa over 10 minutes. While reducing the pressure, the temperature was increased to 210° C., and the temperature was then increased to 220° C. for 60 minutes after initiation of the reaction. Then, 80 minutes later, the pressure was reduced to 20.00 kPa over 10 minutes. The temperature was increased to 240° C., and at the same time, the pressure was reduced to 0 kPa. Thereafter, the reaction mixture was retained for 30 minutes, and nitrogen gas was then introduced into the reaction system. The pressure was returned to 101.3 kPa, and a polycarbonate resin was obtained.

The obtained polycarbonate resin had a refractive index of 1.6125, an Abbe number of 25.98, Tg of 142° C., and a polystyrene-converted converted weight average molecular weight (Mw) of 34459. The content of the diol compound used as a raw material and the physical properties of the obtained resin are shown in Table 1 below.

Example 2

A polycarbonate resin was obtained in the same manner as that of Example 1, with the exception that 24.9709 g (0.0738 mol) of Compound 1, 16.2833 g (0.0760 mol) of diphenyl carbonate (DPC), and $0.6201\times10^{-4}$ g ($0.7381\times10^{-6}$ mol) of sodium hydrogen carbonate were used as raw materials.

The obtained polycarbonate resin had a refractive index of 1.536, an Abbe number of 38.01, Tg of 134° C., and a polystyrene-converted weight average molecular weight (Mw) of 34425. The content of the diol compound used as a raw material and the physical properties of the obtained resin are shown in Table 1 below.

Example 3

Raw materials, namely, 20.9233 g (0.0477 mol) of 9,9-bis[4-(2-hydroxyethoxy)phenyl]fluorene (BPEF) represented by the structural formula as shown below, 6.9132 g (0.0204 mol) of terephthalaldehyde trimethylolethane diacetal obtained in Synthetic Example 3 (hereinafter referred to as Compound 2), 15.0581 g (0.0703 mol) of diphenyl carbonate (DPC), and $0.5725\times10^{-4}$ g ($0.6814\times10^{-6}$ mol) of sodium hydrogen carbonate were placed in a 300-mL reactor equipped with a stirrer and a distillation apparatus, and the inside of the reaction system was set to be a nitrogen atmosphere at 101.3 kPa. This reactor was immersed in an oil bath heated to 200° C., and an transesterification reaction was initiated. Five minutes after initiation of the reaction, stirring was started, and 20 minutes later, the pressure was reduced from 101.3 kPa to 26.66 kPa over 10 minutes. While reducing the pressure, the temperature was increased to 210° C., and the temperature was then increased to 220° C. for 70 minutes after initiation of the reaction. Then, 90 minutes later, the pressure was reduced to 20.00 kPa over 10 minutes. The temperature was increased to 240° C., and at the same time, the pressure was reduced to 0 kPa. Thereafter, the reaction mixture was retained for 30 minutes, and nitrogen gas was then introduced into the reaction system. The pressure was returned to 101.3 kPa, and a polycarbonate resin was obtained.

The obtained polycarbonate resin had a refractive index of 1.6095, an Abbe number of 26.09, Tg of 153° C., and a polystyrene-converted weight average molecular weight (Mw) of 16844. The content of the diol compound used as a raw material and the physical properties of the obtained resin are shown in Table 1 below.

Example 4

A polycarbonate resin was obtained in the same manner as that of Example 3, with the exception that the amounts of the raw materials were changed to those shown in Table 1 below. The physical properties of the obtained resin are shown in Table 1 below.

Comparative Example 1

A polycarbonate resin was obtained in the same manner as that of Example 1, with the exception that 42.5953 g (0.0971 mol) of BPEF, 12.6658 g (0.0416 mol) of spiroglycol (3,9-bis(1,1-dimethyl-2-hydroxyethyl)-2,4,8,10-tetraoxaspiro[5.5]undecane) (SPG) represented by the structural formula as shown below, 30.6188 g (0.1429 mol) of DPC, and $1.1656\times10^{-4}$ g ($1.3874\times10^{-6}$ mol) of sodium hydrogen carbonate were used as raw materials.

The obtained polycarbonate resin had a refractive index of 1.5998, an Abbe number of 26.53, Tg of 134° C., and a polystyrene-converted weight average molecular weight (Mw) of 39,000. The content of the diol compound used as a raw material and the physical properties of the obtained resin are shown in Table 1 below.

Comparative Example 2

A reaction was intended to be performed in the same manner as that of Example 1, with the exception that 42.2300 g (0.0416 mol) of spiroglycol (3,9-bis(1,1-dimethyl-2-hydroxy ethyl)-2,4,8,10-tetraoxaspiro[5.5]undecane) (SPG), 30.6188 g (0.1429 mol) of DPC, and $1.165\times10^{-4}$ g ($1.3874\times10^{-6}$ mol) of sodium hydrogen carbonate were used as raw materials. However, the reaction mixture was crystallized during the reaction, and thus, a polycarbonate resin could not be obtained.

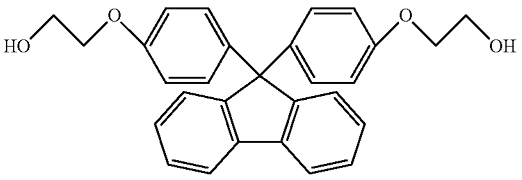

BPEF

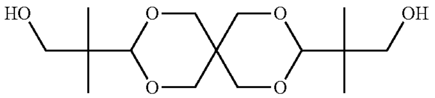

Spiroglycol (SPG)

Compound 1: Isophthalaldehyde trimethylolethane diacetal

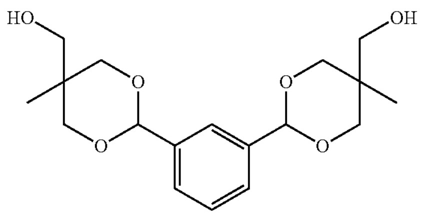 [SMILES: CC1(CO)COC(c2cccc(C3OCC(C)(CO)CO3)c2)OC1]

Compound 2: Terephthalaldehyde trimethylolethane diacetal

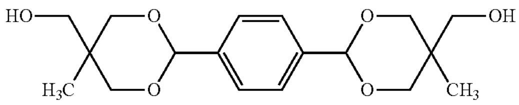

TABLE 1

| | Raw Material (Diol Compound) | | | | | | | | Physical Properties of Polymer | | | |
|---|---|---|---|---|---|---|---|---|---|---|---|---|
| | Compound 1 or 2 | BPEF | SPG | Compound 1 or 2 | BPEF | SPG | Compound 1 or 2, or SPG | Diol other than Compound 1 or 2 or SPG | | | | |
| | (g) | (g) | (g) | (mol) | (mol) | (mol) | (mol %) | (mol %) | nD | ν | Tg | Mw |
| Example 1 | 7.4982 | 22.6470 | 0 | 0.0222 | 0.0516 | 0 | 30 | 70 | 1.6125 | 25.98 | 142 | 34459 |
| Example 2 | 24.9709 | 0 | 0 | 0.0738 | 0 | 0 | 100 | 0 | 1.536 | 38.01 | 134 | 34425 |
| Example 3 | 6.9132 | 20.9233 | 0 | 0.0204 | 0.0477 | 0 | 30 | 70 | 1.6095 | 26.09 | 153 | 16844※ |
| Example 4 | 6.9877 | 21.1214 | 0 | 0.0206 | 0.0482 | 0 | 30 | 70 | 1.6092 | 26.08 | 155 | 31967 |
| Comp. Ex. 1 | 0 | 42.5953 | 12.6658 | 0 | 0.0971 | 0.0416 | 30 | 70 | 1.5988 | 26.53 | 134 | 39000 |

* After preparation of a sample solution, the presence of an insoluble matter was confirmed by visual observation. Since the reaction mixture was poured into a column after it had been filtrated through a syringe filter (GL ChromatoDisk, manufactured by GL Sciences; pore diameter: 0.45 μm), the data were given only for the dissolved portion.

The invention claimed is:

1. A thermoplastic resin comprising a constituent unit (A) derived from a monomer represented by the following general formula (1):

(1)

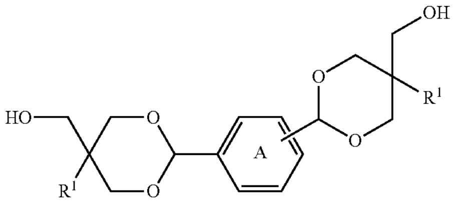

wherein $R^1$s, which are the same or different, each represent a hydrogen atom, a fluorine atom, a chlorine atom, a bromine atom, a phenyl group, or a linear or branched alkyl group containing 1 to 4 carbon atoms; and ring A represents a benzene ring optionally substituted with 1 to 4 groups selected from the group consisting of a fluorine atom, a chlorine atom, a bromine atom, a phenyl group, a linear or branched alkoxy group containing 1 to 6 carbon atoms, and a linear or branched alkyl group containing 1 to 6 carbon atoms, wherein the thermoplastic resin is a polycarbonate resin or a polyester carbonate resin.

2. The thermoplastic resin according to claim 1, wherein, in the general formula (1), $R^1$s, which are the same or different, each represent a methyl group, an ethyl group, an n-propyl group, an iso-propyl group, an n-butyl group, an iso-butyl group, a sec-butyl group, a tert-butyl group, or a phenyl group.

3. The thermoplastic resin according to claim 2, wherein, in the general formula (1), $R^1$s, which are the same or different, each represent a methyl group or an ethyl group.

4. The thermoplastic resin according to claim 1, wherein, in the general formula (1), the ring A represents a benzene ring optionally substituted with 1 to 4 groups selected from the group consisting of a linear or branched alkoxy group containing 1 to 6 carbon atoms and a linear or branched alkyl group containing 1 to 6 carbon atoms.

5. The thermoplastic resin according to claim 1, wherein, in the general formula (1), $R^1$ represents a methyl group or an ethyl group, and the ring A represents a benzene ring optionally substituted with 1 to 4 groups selected from the group consisting of a methyl group and an ethyl group.

6. The thermoplastic resin according to claim 1, wherein the monomer represented by the general formula (1) is a monomer represented by the following general formula (1a):

(1a)

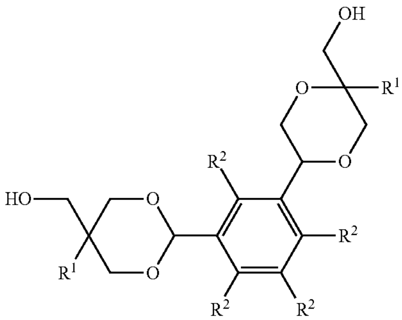

wherein $R^2$s, which are the same or different, each represent a hydrogen atom, a fluorine atom, a chlorine atom, a bromine atom, a phenyl group, a linear or branched alkoxy group containing 1 to 6 carbon atoms, or a linear or branched alkyl group containing 1 to 6 carbon atoms.

7. The thermoplastic resin according to claim 1, wherein the monomer represented by the general formula (1) is a monomer represented by the following general formula (1b):

(1b)

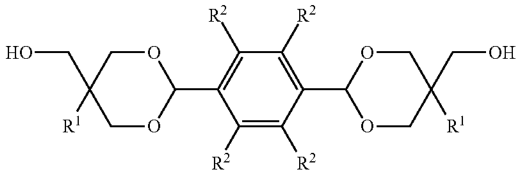

wherein $R^2$s, which are the same or different, each represent a hydrogen atom, a fluorine atom, a chlorine atom, a bromine atom, a phenyl group, a linear or branched alkoxy group containing 1 to 6 carbon atoms, or a linear or branched alkyl group containing 1 to 6 carbon atoms.

8. The thermoplastic resin according to claim 1, wherein the monomer represented by the general formula (1) is a monomer represented by the following general formula (1c):

(1c)

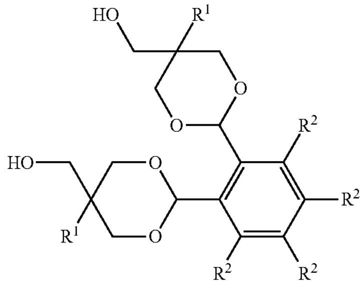

wherein $R^2$s, which are the same or different, each represent a hydrogen atom, a fluorine atom, a chlorine atom, a bromine atom, a phenyl group, a linear or branched alkoxy group containing 1 to 6 carbon atoms, or a linear or branched alkyl group containing 1 to 6 carbon atoms.

9. The thermoplastic resin according to claim 1, which comprises a constituent unit (B) derived from a monomer represented by the following formula (2) and/or a constituent unit (C) derived from a monomer represented by the following formula (3):

(2)

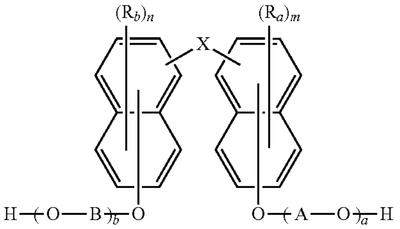

wherein, in the formula (2), $R_a$ and $R_b$ are each independently selected from the group consisting of a hydrogen atom, a halogen atom, a C1-C20 alkyl group optionally having a substituent, a C1-C20 alkoxy group optionally having a substituent, a C5-C20 cycloalkyl group optionally having a substituent, a C5-C20 cycloalkoxy group optionally having a substituent, a C6-C20 aryl group optionally having a substituent, a C6-C20 heteroaryl group optionally having a substituent, which contains one or more heterocyclic atoms selected from O, N and S, a C6-C20 aryloxy group optionally having a substituent, and —C≡C—$R_h$, wherein $R_h$ represents a C6-C20 aryl group optionally having a substituent, or a C6-C20 heteroaryl group optionally having a substituent, which contains one or more heterocyclic atoms selected from O, N and S, X represents a single bond or a fluorene group optionally having a substituent, A and B each independently represent a $C_1$-$C_5$ alkylene group optionally having a substituent, m and n each independently represent an integer of 0 to 6, and a and b each independently represent an integer of 0 to 10; and/or (3)

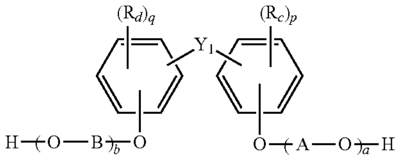

wherein, in the formula (3), $R_c$ and $R_d$ each independently selected from the group consisting of a hydrogen atom, a halogen atom, a C1-C20 alkyl group optionally having a substituent, a C1-C20 alkoxy group optionally having a substituent, a C5-C20 cycloalkyl group optionally having a substituent, a C5-C20 cycloalkoxy group optionally having a substituent, and a C6-C20 aryl group optionally having a substituent, $Y_1$ represents a single bond, a fluorene group optionally having a substituent, or any one of structural formulae represented by the following formulae (4) to (10):

(4)

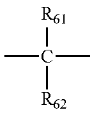

(5)

$$—S—$$

(6)

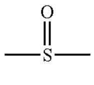

(7)

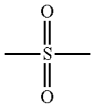

(8)

$$—(CH_2)_r—$$

(9)

$$—O—$$

(10)

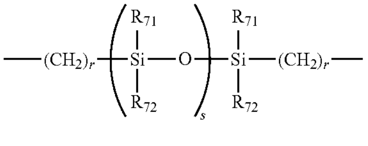

wherein, in the formulae (4) to (10), $R_{61}$, $R_{62}$, $R_{71}$ and $R_{72}$ each independently represent a hydrogen atom, a halogen atom, a C1-C20 alkyl group optionally having a substituent, or a C6-C30 aryl group optionally having a substituent, or represent a C1-C20 carbon ring or heterocyclic ring optionally having a substituent, which is formed as a result that $R_{61}$ and $R_{62}$, or $R_{71}$ and $R_{72}$ bind to each other, and r and s each independently represent an integer of 0 to 5000, A and B each independently represent a $C_1$-$C_5$ alkylene group optionally having a substituent, p and q each independently represent an integer of 0 to 4, and a and b each independently represent an integer of 0 to 10.

10. The thermoplastic resin according to claim 9, wherein, in the formula (2) and the formula (3), the A and B each independently represent an alkylene group containing 2 or 3 carbon atoms.

11. The thermoplastic resin according to claim 9, which comprises a constituent unit derived from, at least, any one of BPEF, BNE, BNEF and DPBHBNA.

12. The thermoplastic resin according to claim 1, which further comprises a constituent unit derived from at least one monomer selected from the following monomer group:

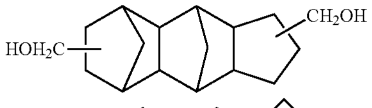

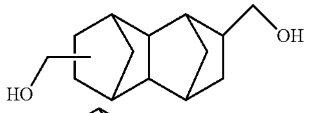

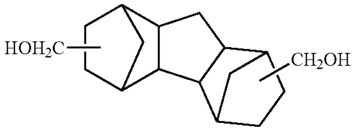

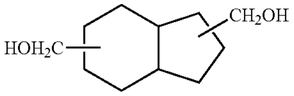

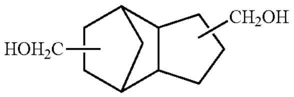

-continued

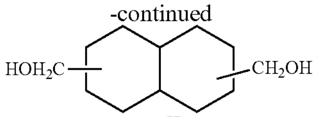

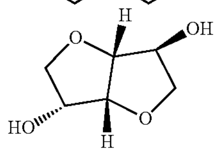

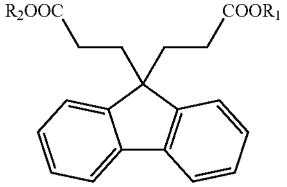

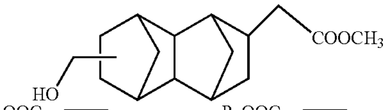

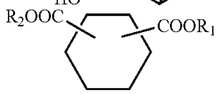

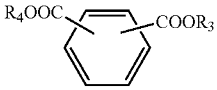

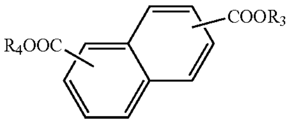

wherein, in the formulae, $R_1$ and $R_2$ each independently represent a hydrogen atom, a methyl group or an ethyl group, and $R_3$ and $R_4$ each independently represent a hydrogen atom, a methyl group, an ethyl group, or alkylene glycol containing 2 to 5 carbon atoms.

13. The thermoplastic resin according to claim 1, which has a polystyrene-converted weight average molecular weight (Mw) of 10,000 to 200,000.

14. The thermoplastic resin according to claim 1, which has a refractive index (nD) of 1.599 to 1.750.

15. The thermoplastic resin according to claim 1, which has an Abbe number (v) of 25.0 to 33.0.

16. The thermoplastic resin according to claim 1, which has a glass transition temperature of 135° C. to 200° C.

17. An optical lens, comprising the thermoplastic resin according to claim 1.

18. An optical film, comprising the thermoplastic resin according to claim 1.

* * * * *